(12) United States Patent
Bardsley et al.

(10) Patent No.: US 7,386,883 B2
(45) Date of Patent: Jun. 10, 2008

(54) SYSTEMS, METHODS AND COMPUTER PROGRAM PRODUCTS FOR ADMINISTRATION OF COMPUTER SECURITY THREAT COUNTERMEASURES TO A COMPUTER SYSTEM

(75) Inventors: Jeffrey S. Bardsley, Morrisville, NC (US); Ashley A. Brock, Morrisville, NC (US); Charles K. Davis, III, Mechanicsburg, PA (US); Nathaniel W. Kim, Raleigh, NC (US); John J. McKenna, Cary, NC (US); Carlos F. Villegas, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 10/624,158

(22) Filed: Jul. 22, 2003

(65) Prior Publication Data

US 2005/0039046 A1 Feb. 17, 2005

(51) Int. Cl.
*G06F 11/00* (2006.01)
(52) U.S. Cl. .................. 726/22; 705/51; 705/52; 705/53; 705/54; 713/189; 713/190; 713/191; 717/168; 717/169; 717/170
(58) Field of Classification Search ............ 705/51–54; 713/189–194; 717/168–173; 726/22–25
See application file for complete search history.

(56) References Cited

U.S. PATENT DOCUMENTS 1,450,736 A 4/1923 Smith (Continued)

FOREIGN PATENT DOCUMENTS

CA 2316005 A1 2/2002

(Continued)

OTHER PUBLICATIONS

*About the VulnXML Project*, The Open Web Application Security Project, http://www.owasp.org/vulnxml/, 2001-2002, 2 pp.

(Continued)

*Primary Examiner*—Kambiz Zand
*Assistant Examiner*—Roderick Tolentino
(74) *Attorney, Agent, or Firm*—Dillon & Yudell LLP

(57) ABSTRACT

A countermeasure for a computer security threat to a computer system is administered by establishing a baseline identification of an operating or application system type and an operating or application system release level for the computer system that is compatible with a Threat Management Vector (TMV). A TMV is then received, including therein a first field that provides identification of at least one operating system type that is affected by a computer security threat, a second field that provides identification of an operating system release level for the operating system type, and a third field that provides identification of a set of possible countermeasures for an operating system type and an operating system release level. Countermeasures that are identified in the TMV are processed if the TMV identifies the operating system type and operating system release level for the computer system as being affected by the computer security threat. The received TMV may be mutated to a format for processing of the countermeasure.

5 Claims, 23 Drawing Sheets

U.S. PATENT DOCUMENTS

| | | | |
|---|---|---|---|
| 5,940,135 | A | 8/1999 | Petrovic et al. |
| 6,049,289 | A | 4/2000 | Waggamon et al. |
| 6,185,689 | B1 | 2/2001 | Todd, Sr. et al. |
| 6,408,391 | B1 | 6/2002 | Huff et al. |
| 7,073,198 | B1* | 7/2006 | Flowers et al. ............... 726/25 |
| 2001/0027389 | A1 | 10/2001 | Beverina et al. |
| 2002/0026591 | A1 | 2/2002 | Hartley et al. |
| 2002/0078382 | A1 | 6/2002 | Sheikh et al. |
| 2002/0099958 | A1 | 7/2002 | Hrabik et al. |
| 2002/0166063 | A1 | 11/2002 | Lachman, III et al. |
| 2002/0178383 | A1 | 11/2002 | Hrabik et al. |
| 2003/0004688 | A1 | 1/2003 | Gupta et al. |
| 2003/0004689 | A1 | 1/2003 | Gupta et al. |
| 2003/0009699 | A1 | 1/2003 | Gupta et al. |
| 2003/0084549 | A1 | 5/2003 | Friedrichs et al. |
| 2003/0172292 | A1 | 9/2003 | Judge |
| 2004/0006704 | A1* | 1/2004 | Dahlstrom et al. ......... 713/200 |

FOREIGN PATENT DOCUMENTS

| | | |
|---|---|---|
| WO | WO 98/06020 A2 | 2/1998 |
| WO | WO 00/70456 A1 | 11/2000 |

OTHER PUBLICATIONS

Carnegie Mellon Software Engineering Institute, *CERT®/CC: Computer Security Incident Response Team FAQ*, http://www.cert.org/csirts/csirt_faq.html, 2002-2003, 9 pp.

*Citadel Hercules Automated Vulnerability Remediation Product Brochure*, Citadel Security Software Inc., 2003.

*CVE Common Vulnerabilities and Exposure (CVE)—Mitre Develops Valuable Resource for Sharing Vulnerability Information*, http://www.mitre.org/news/digest/archives/2000/vulnerability_info.html, 2000, 3 pp.

*Enabling Enterprise Security with CVE*, http://ww.mitre.org/news/digest/archives/2001/enterprise_security.html, 2001, 5 pp.

Ghosh et al., *Inoculating Software for Survivability*, Communications of the ACM, vol. 42, No. 7, Jul. 1999, pp. 38-44.

GSA Federal Technology Service, *Federal Computer Incident Response Center PADC (Patch Authentication and Dissemination Capability*, Smarter Solutions, Publication No. E-COTEO-03-0002.

12Biscom, *Network Security*, http://www.b2biscom.it/cms/Generic.jsp?IdPage=458, 2003, 1 p.

IBM, *Internet Data Center Value-Add Feature: Certifiable High-Speed RAM Web Servers*, Research Disclosure, #454147, Feb. 2002, p. 313.

IBM, *Remote-Controlled Write-Lock in Hard Disk (HD)Controllers*, Research Disclosure, #446114, Jun. 2001, p. 1001.

*ICAT Metabase Documentation*, http://icat.nist.gov/icat_documentation.htm, 5pp.

*ICAT Metabase: A CVE Based Vulnerability Database*, http://icat.nist.gov/icat.cfm, 2000-2002, 2 pp.

Martin, *Managing Vulnerabilities in Your Networked Systems Using an Industry Standards Effort*, NDIA Federal Database Colloquium & Exposition, Oct. 25, 2001, 2 pp., Abstract at http://www.mitre.org/work/tech_papers/tech_papers_01/martin_1vulner/index.html.

Mitre, Press Release, *Mitre Announces New Standard for Computer Vulnerability Assessment*, http://www.mitre.org/news/releases/02/oval12_10_02.html, 2002, 2 pp.

Myerson, *Identifying Enterprise Network Vulnerabilities*, International Journal of Network Management, vol. 12, 2002, pp. 135-144.

*Oasis Members Collaborate to Address Security Vulnerabilities for Web Services and Web Applications*, http://www.oasis-open.org/news/oasis_news_04_14_03a.php, Apr. 14, 2003.

OWASP, *Introducing the OWASP Top Ten—Top Vulnerabilities in Web Applications*, The Open Web Application Security Project, http://www.owasp.org/, 2001-2002, 2 pp.

Sans Institute, *About the Sans Institute*, http://www.sans.org/aboutsans.php, 2002-2003, 4 pp.

Tasker et al., *CVE Continues to Grow*, The Edge, Feb. 2001, http://www.mitre.org/news/the_edge/february_01/tasker.html, 2 pp.

*VulnXML Proof of Concept Vision Document, Version 1*, The Open Web Application Security Project, 2002, 7 pp.

* cited by examiner

FIG. 2
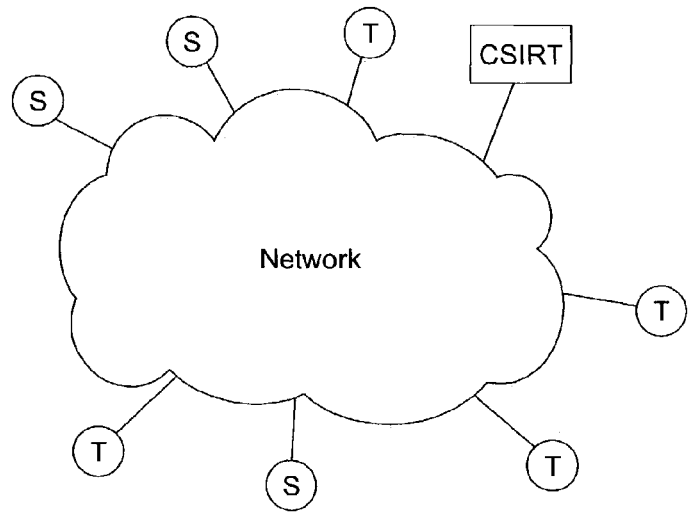
FIG. 3
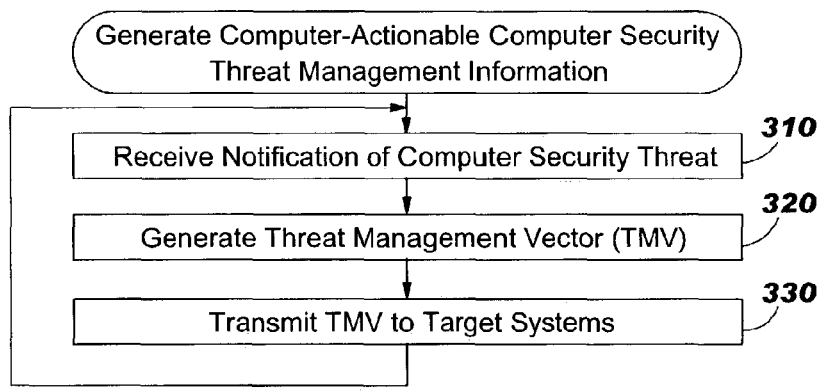
FIG. 4
| TMV | Vulnerability Specification | System Type | Release Level | Subsystem Type | Release Level | ID of Countermeasures |
|---|---|---|---|---|---|---|
400, 406, 401, 402, 404, 405, 403

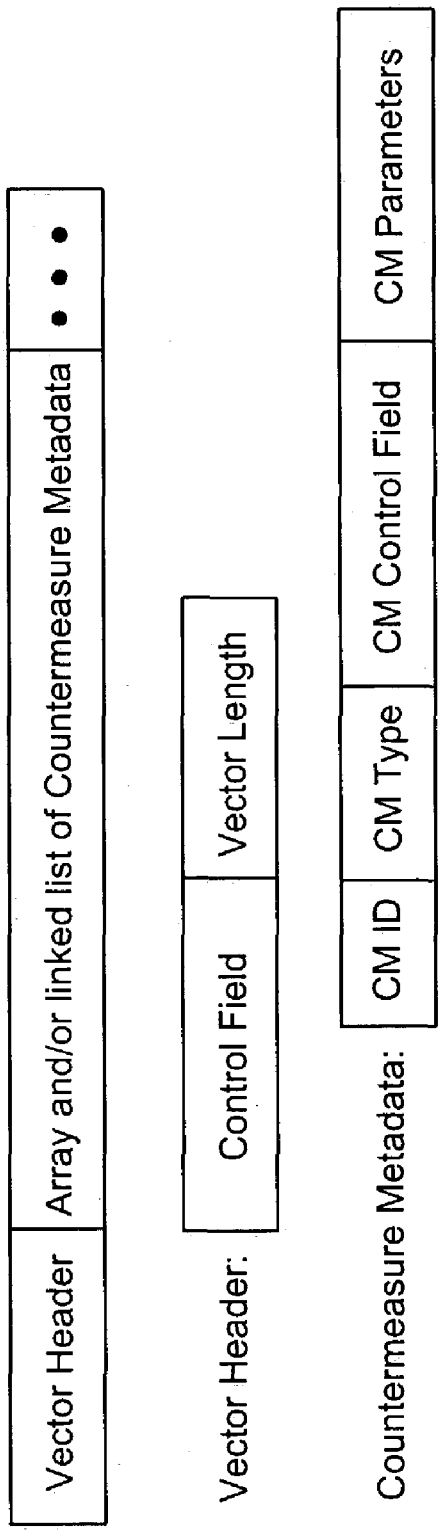

FIG. 13

System Table (indexed by System ID and System Name):

| SystemID (assigned by TMANA) | System Name (from NIST ICAT) | System Level Table |
|---|---|---|

Where System Level Table is defined as:

| Level ID (assigned by TMANA) | Version and Release Number (assigned by NIST ICAT or vendors) |
|---|---|

Subsystem Table (indexed by Subsystem ID and Subsystem Name):

| SubsystemID (assigned by TMANA) | Subsystem Name (from NIST ICAT) | Subsystem Level Table (as above) |
|---|---|---|

Threat Severity Table (indexed by Severity ID and Severity Name):

| Severity ID (assigned by TMANA) | Severity Name (from NIST ICAT) |
|---|---|

Countermeasure (CM) Table (indexed by CM ID, CM Type, and CM Name):

| CM ID (assigned by TMANA) | CM Type (assigned by TMANA) | CM Name (assigned by TMANA) |
|---|---|---|

SYSTEMS, METHODS AND COMPUTER PROGRAM PRODUCTS FOR ADMINISTRATION OF COMPUTER SECURITY THREAT COUNTERMEASURES TO A COMPUTER SYSTEM

CROSS REFERENCE TO RELATED APPLICATION

This application is related to application Ser. No. 10/624,344, entitled Systems, Methods and Data Structures for Generating Computer-Actionable Computer Security Threat Management Information, filed concurrently, assigned to the assignee of the present application, the disclosure of which is hereby incorporated herein by reference in its entirety as if set forth fully herein.

FIELD OF THE INVENTION

This invention relates to computer systems, methods, program products and/or data structures, and more particularly to security management systems, methods, program products and/or data structures for computer systems.

BACKGROUND OF THE INVENTION

Computer systems are widely used for data processing and many other applications. As used herein, a "computer system" encompasses enterprise, application and personal computer systems, pervasive computer systems such as personal digital assistants, and embedded computer systems that are embedded in another device such as a home appliance that has another primary functionality.

As information technology continues to expand at a dramatic pace, computer systems are subject to larger numbers of security threats and vulnerabilities. System administrators may be overburdened with not only gathering and maintaining information on new vulnerabilities and patches, but may also need to wrestle with the task of determining what patches need to be applied and to what systems. A desire for computer systems to be kept current to known and developing security threats may produce a problem of enormous proportions.

Many vendors and independent developers have sought to create and develop ways in which computer system administrators can find out the current vulnerability status of their systems. In particular, vendor programs, utilities and locally generated scripts have been provided that can reveal specific information about computer systems. Thus, for example, Microsoft has provided a utility called HFNETCK, created by Shavlik, which scans host systems for missing patches. Moreover, Unix systems have built-in commands that can list operating system and patch level information. Several databases have also been created as repositories of information about computer systems, including IP addresses, operating system vendor version and possibly the latest patches applied.

For example, the Mitre Corporation (Mitre.org) has promulgated Common Vulnerabilities and Exposures (CVE), which anecdotally represent vulnerabilities and exposures using a text string with a chronological identification vector and free-form text. An example CVE is "CVE-2001-0507+ free form text". Moreover, the National Institute of Standards and Technology (NIST) has created an ICAT Metabase, which is a searchable index of information on computer vulnerabilities. Using CVE names, the ICAT Metabase vulnerability indexing service provides a short description of each vulnerability, a list of the characteristics of each vulnerability (such as associated attack range and damage potential), a list of the vulnerable software names and version numbers, and links to vulnerability advisory and patch information. See icat.nist.gov/icat.cfm. Also, in the fourth quarter of 2002, Mitre launched the Open Vulnerability Assessment Language (OVAL) initiative, to extend the CVE concept to a common way of vulnerability testing.

The Open Web Application Security Project (owasp.org) is an open source community project that is developing software tools and knowledge-based documentation that helps secure Web applications and Web services. The VulnXML project of OWASP aims to develop an open standard data format for describing Web application security vulnerabilities. The project is focused on Web application security vulnerabilities. It focuses on building http transactions such as specific headers and requests. See the VulnXML Proof of Concept Vision Document, Version 1.1, Jul. 18, 2002.

The Patch Authentication and Dissemination Capability (PADC) project, sponsored by the Federal Computer Incident Response Center (FedCIRC), an office of the General Services Administration, first announced in November, 2002, addresses the more general case of application and operating system vulnerabilities. See, padc.fedcirc.gov. Although contracts have been awarded, PADC service is not presently available.

The OASIS Consortium (oasis-open.org) has announced plans to define a standard method of exchanging information concerning security vulnerabilities within Web services and Web applications. See, *OASIS Members Collaborate to Address Security Vulnerabilities for Web Services and Web Applications*, RSA Security Conference, 14 Apr. 2003.

The Vulnerability Intelligent Profiling Engine (VIPE) is based on technology by B2Biscom (b2biscom.it). VIPE includes two elements, a product and a service. The product is a combination of an inventory and patch management tool, which has as its major part a central database containing all known vulnerabilities and patches for a large list of products. Another part of the database is populated with inventory information. A set of scripts has been developed. The service analyzes and correlates inventory with an existing vulnerability encyclopedia, and provides a knowledge-based approach for assailing vulnerabilities against specific supported operating systems.

Finally, Citadel Hercules Automated Vulnerability Remediation from Citadel Security Software (citadel.com) provides software that integrates with industry-leading vulnerability assessment tools and provides appropriate remedies for five classes of vulnerabilities, and a console where the administrator can review the vulnerabilities implied and apply the remedy to the correct system on a network. See, *Citadel Hercules Automated Vulnerability Remediation Product Brochure*, Citadel Security Software Inc., 2003.

In view of the above, security threat management currently may be a labor-intensive process wherein a computer system's operations staff individually screens security advisories, alerts and Authorized Program Analysis Reports (APARs) to determine their applicability. The operational staff then determines, through research, how to mitigate the threat or apply the remedy using manual techniques.

FIG. 1 is a block diagram illustrating conventional security threat management techniques. As shown in FIG. 1, new computer vulnerabilities and hacking tools are discovered by computer security experts 110 in a variety of roles. Similarly, APARs are provided by vendors 120. The computer vulnerabilities, hacking tools and APARs (often referred to as $A^3$ (Advisories, Alerts, APARs)) are typically vetted by appropriate security organizations such as a Computer Emergency Response Team (CERT/CC), SysAdmin, Audit, Network and/or Security (SANS) institute personnel 130. Threat and vulnerability information is distributed by these organizations primarily via mailing lists 140 that are subscribed to by computer Security Systems Administration (SSA) staffs 150. Diligent SSAs may subscribe to multiple mailing lists 140, thus often receiving duplicate or potentially inconsistent information. SSAs then perform individual research to determine a course of action and how to carry it out. Commonly, they will use Web resources such as Mitre's CVE listing 160 and/or OVAL database 170, and/or NIST's ICAT database 180, to manually collect information for countermeasure application. This may be highly inefficient and costly.

SUMMARY OF THE INVENTION

A countermeasure for a computer security threat to a computer system is administered according to some embodiments of the present invention, by establishing a baseline identification of an operating system type and an operating system release level for the computer system that is compatible with a Threat Management Vector (TMV). A TMV is then received, including therein a first field that provides identification of at least one operating system type that is affected by a computer security threat, a second field that provides identification of an operating system release level for the operating system type, and a third field that provides identification of a set of possible countermeasures for an operating system type and an operating system release level. Countermeasures that are identified in the TMV are processed if the TMV identifies the operating system type and operating system release level for the computer system as being affected by the computer security threat. In some embodiments, the received TMV is pruned to discard at least some of the TMV that is not needed for the processing of countermeasures. In other embodiments, the received TMV is mutated in format for processing of the countermeasures.

In some embodiments, a TMV history file is received in response to installation, configuration or maintenance of the computer system and the countermeasures that are identified in the TMV history file are processed. Moreover, a Threat Management Information Base (TMIB) for the computer system may be updated to account for the countermeasures that are processed.

In still other embodiments, at least one instance identifier is added to the TMV that is received, to account for multiple instances of the operating system running on the computer system, if the TMV identifies the operating system type and operating system release level for the computer system as being affected by the computer security threat. In these embodiments, countermeasures that are identified in the TMV for the instance of the operating system type and operating system release level are processed when the instance of the operating system type and operating system release level is instantiated in the computer system.

In yet other embodiments of the present invention, the TMV also includes a fourth field that provides identification of at least one application program type that is affected by the computer security threat and a fifth field that provides identification of a release level for the application program type. In these embodiments, the third field provides identification of the set of possible countermeasures for an operating system type and release level and an application program type and release level. In still other embodiments, the TMV further includes a sixth computer-readable field that provides identification of the security threat or vulnerability. Countermeasures that are identified in the TMV are processed if the TMV identifies the operating system type and release level and the application program type and release level for the computer system as being affected by the computer security threat. Instance identifiers may be added to account for multiple instances of the application program running on the computer system.

It will be understood that embodiments of the invention have been described above primarily with respect to methods of administering a computer security threat vulnerability or countermeasure to a computer system. However, other embodiments of the present invention provide a computer system itself and/or a computer program product that is configured to administer a computer security threat vulnerability or countermeasure to a computer system.

BRIEF DESCRIPTION OF THE DRAWINGS

FIG. 2 is a block diagram of an environment in which computer-actionable computer security threat management information may be generated according to some embodiments of the present invention.

FIG. 3 is a flowchart of operations that may be performed to generate computer-actionable security threat management information according to some embodiments of the present invention.

FIG. 4 is an overview of a data structure of a threat management vector according to some embodiments of the present invention.

FIGS. 7-14 illustrate detailed data structures of threat management vectors and sub-vectors according to some embodiments of the present invention.

DETAILED DESCRIPTION

Figure 1:
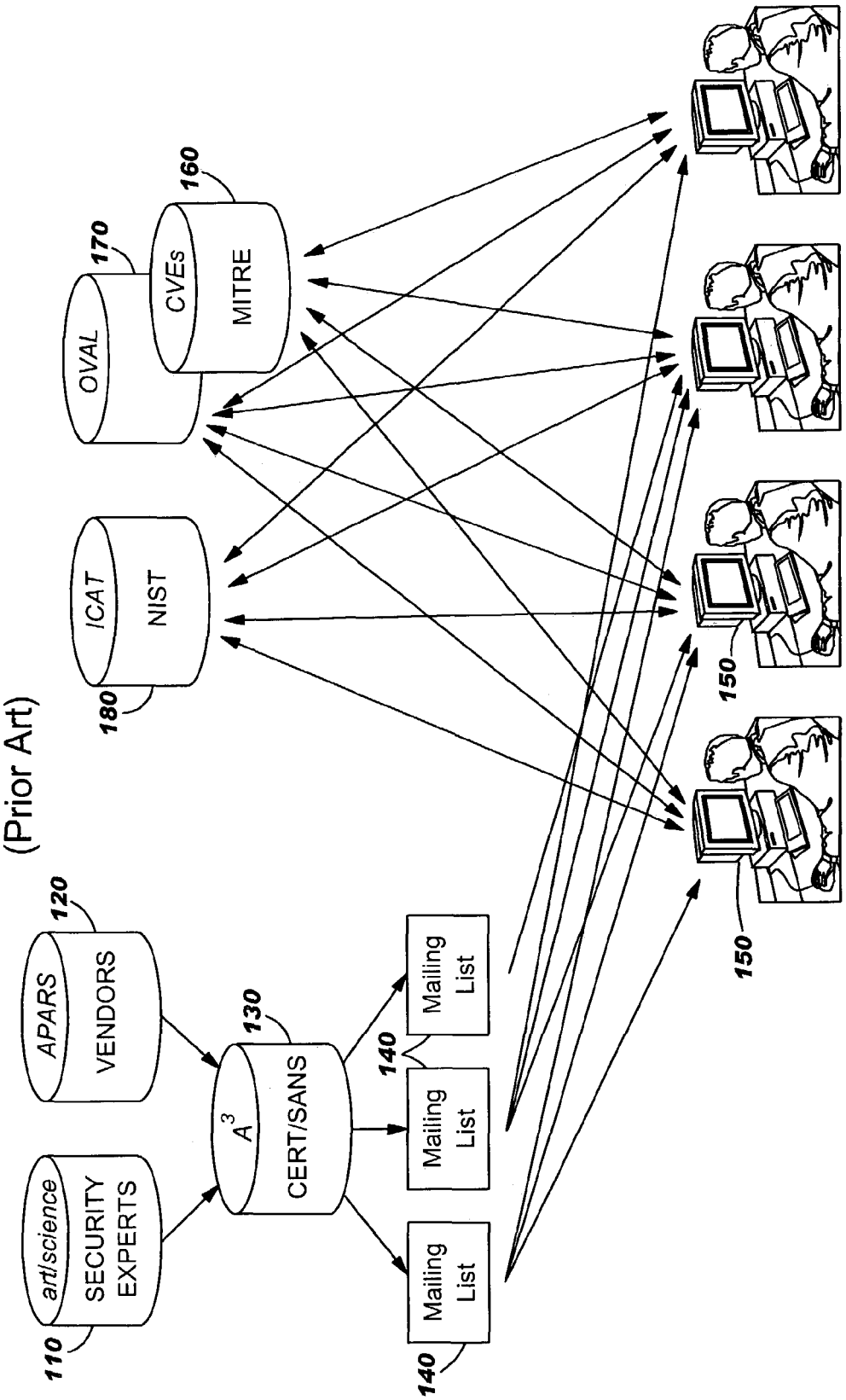
FIG. 1 is a block diagram illustrating conventional security threat management techniques.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Generating Computer-Actionable Computer Security Threat Management Information

FIG. 2 is a block diagram of an environment in which computer-actionable computer security threat management information may be generated according to some embodiments of the present invention. As shown in FIG. 2, a plurality of sources S of vulnerability threat and/or APAR information are connected to a Computer Security Incident Response Team (CSIRT) or other security-responsible server via a network, which can be a local and/or wide area network including the Web. The sources S can be one or more of the sources 110, 120, 130, 160, 170, 180 of FIG. 1, and/or other sources. The CSIRT server sends computer-actionable computer security threat management information to a plurality of target computer systems T which can be one or more enterprise, application, personal, pervasive and/or embedded systems that may be connected to the CSIRT directly and/or via a network. According to embodiments of the invention, the computer-actionable computer security threat management information comprises one or more computer-actionable Threat Management Vectors (TMV), as will be described in detail below.

FIG. 3 is a flowchart of operations that may be performed, for example by the CSIRT server, to generate computer-actionable computer security threat management information, according to some embodiments of the invention. As shown in FIG. 3, notification of a computer security threat is received at Block 310. At Block 320, a computer-actionable TMV is generated from the notification that was received. Further description of the TMV will be provided in FIG. 4. Then, at Block 330, the TMV, or a form of the TMV, that is generated is transmitted to a plurality of target systems for processing by the plurality of target systems.

FIG. 4 is an overview of a data structure of a TMV according to some embodiments of the present invention. Further details will be provided below. As shown in FIG. 4, the TMV 400 includes a first computer-readable field 401 that provides identification of at least one system type, such as an operating system type, that is effected by the security threat, a second computer-readable field 402 that provides identification of a release level for the system type, and a third computer-readable field 403 that provides identification of a set of possible countermeasures for a system type and a release level. Moreover, in some embodiments, the TMV includes a fourth computer-readable field 404 that provides identification of at least one subsystem type, such as an application program type, that is affected by the computer security threat and a fifth computer-readable field 405 that provides identification of a release level for the subsystem type. In these embodiments, the third computer-readable field 403 provides identification of a set of possible countermeasures for a subsystem type and a release level in addition to a system type and release level. Moreover, in some embodiments, the TMV includes a sixth computer-readable field 406 that identifies a vulnerability specification, also referred to herein as a "root VKey vector", to identify the vulnerability or security threat.

Figure 5:
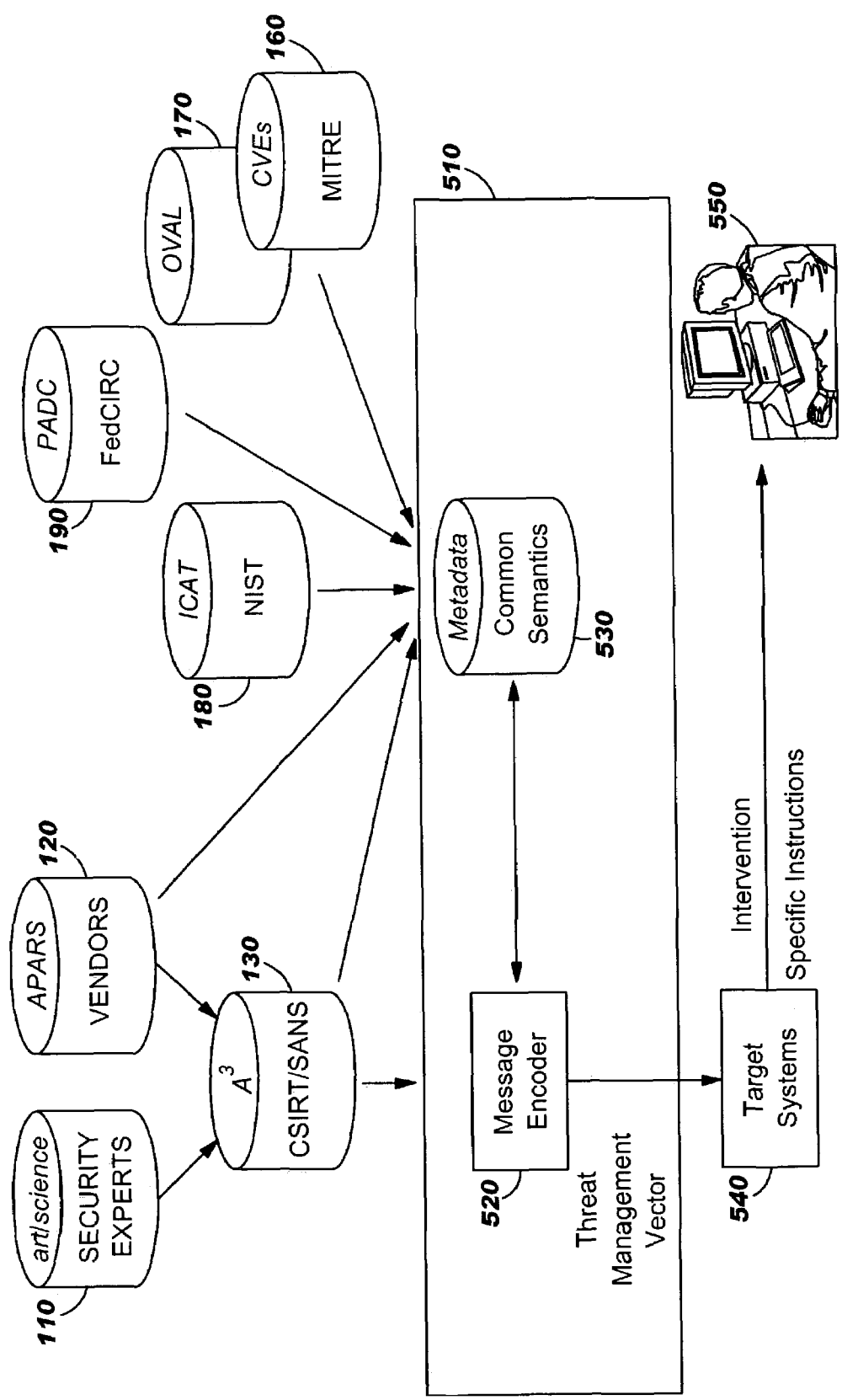
FIG. 5 is a block diagram of systems, methods and/or computer program products for generating computer-actionable security threat management information according to other embodiments of the present invention.

FIG. 5 is a block diagram of systems, methods and computer program products for generating computer-readable security threat management information according to other embodiments of the present invention. As shown in FIG. 5, notification of a computer security vulnerability threat or countermeasure to a vulnerability or threat is received at a central clearinghouse, also referred to herein as a CSIRT 510, from various sources 110-130 and 160-190 that were described above. Other sources may also be utilized. At the CSIRT 510, a message encoder 520 transforms vulnerability, threat, APAR and/or information via human analysis and/or computer-assisted encoding into an unambiguous computer-interpretable form, referred to as a TMV. A common semantics database 530 establishes and maintains, via human analysis and/or computer-assisted encoding, the metadata used by the message encoder 520 to create the TMV. One example is a set of assigned numbers representing computer operating system names. The message encoder 520 produces a TMV in computer-actionable format. For each specific vulnerability, threat or countermeasure, the TMV stipulates target system components and parameterized countermeasure installation instructions for automated application. The TMV is then transmitted to target systems 540. Target System Security Administrators (SSA) 550 may be advised of interventions that may be required to be performed if fully automatic intervention is not present, and/or of specific instructions. Human labor can thereby be reduced dramatically.

Figure 6:
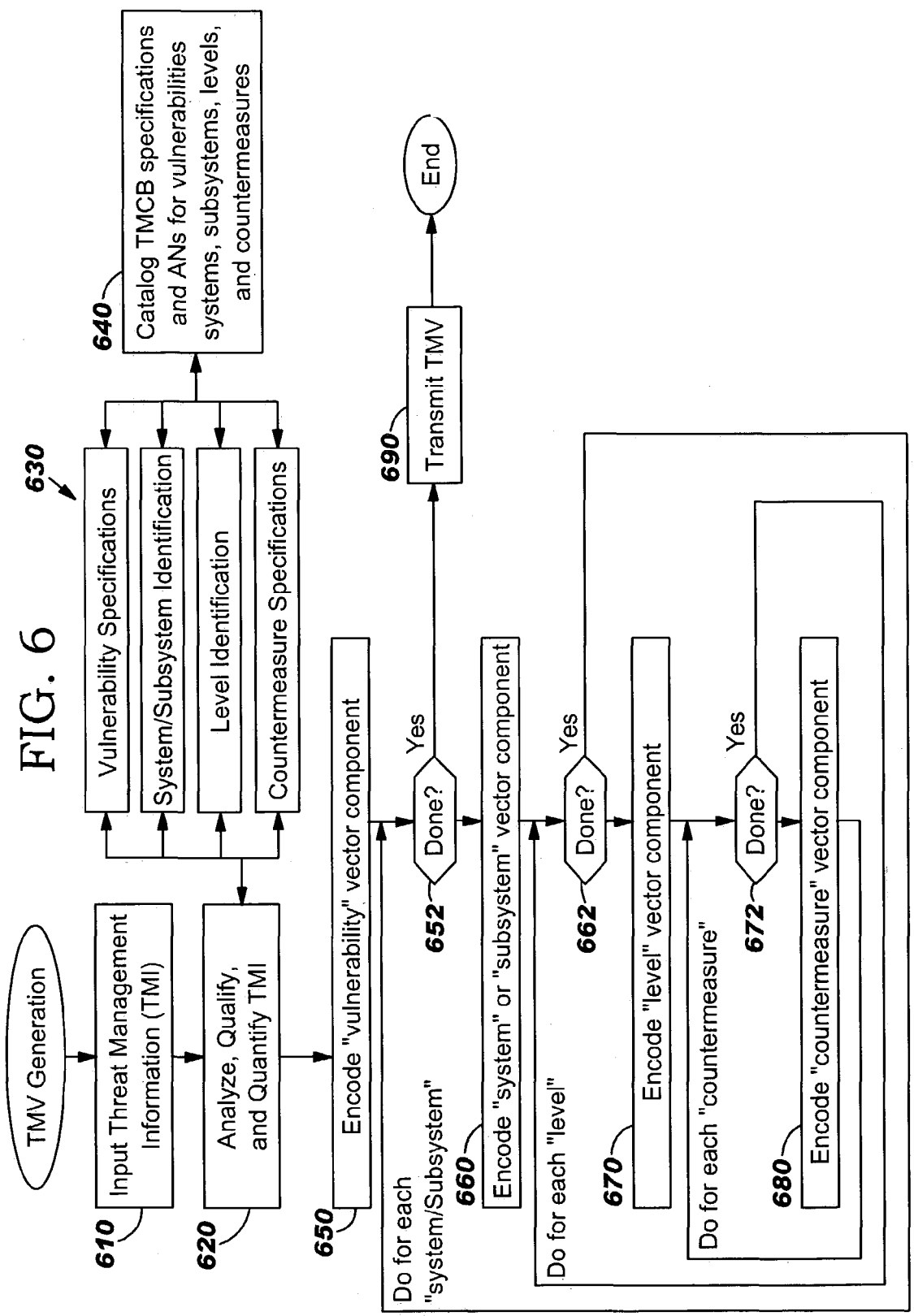
FIG. 6 is a flowchart of operations that may be used to generate a threat management vector by a message encoder according to other embodiments of the present invention.

FIG. 6 is a flowchart of operations that may be used to generate a TMV by a message encoder, such as the message encoder 520 of FIG. 5. FIG. 6 refers to vulnerability alerts and advisories and patch or other countermeasure information as Threat Management Information (TMI). As shown at Block 610, TMI may originate from security organizations, vendors, independent security professionals and/or other sources. TMI may include, but is not limited to, data about vulnerabilities in an operating system or application program or software utility, countermeasures for correcting a vulnerability, or both. Examples of TMI are new or revised security alerts and advisories from CERT/CC or SANS Institute and new or revised patch notifications from vendors.

Referring to FIG. 6, conceptually, TMV generation (TMVG) can be considered a two-stage process. However, in practice, it may be implemented as a single set of integrated operations.

In the first stage, at Block 610, TMI acts as input stimuli for a process of analysis, qualification and quantification (AQQ) at Block 620. Analysis may involve a general analysis and research of the input for completeness and coherence. Qualification may involve validating the accuracy, consistency, source integrity and efficacy of the information for threat management use. Qualification also may involve such details as testing a proposed patch or script on an operating system, application program, or program utility instance in a laboratory or simulated production environment. Finally, quantification may involve ensuring that all relevant TMI has an unambiguous representation in a catalog entity called the Threat Management Control Book (TMCB) such that each information component 630 is discernible via assigned numbers (ANs). The AQQ team, in fact, may represent a threat management assigned number authority (TMANA) by virtue of its authority to create, delete, and otherwise ensure the referential integrity of ANs in the TMCB, respective of external assigned number authorities (ANAs).

In some embodiments, it may be desirable that all ANs and corresponding information encodings for the complete construction of a TMV representing the TMI are available in the TMCB. Any TMI not found to be so represented may be formulated and cataloged in the TMCB by the TMANA at Block 640. TMI categories may include, but are not limited to, vulnerability identity and specification, system identity, system level identity, subsystem identity, subsystem level identity, and countermeasure identity and specification.

The second stage may involve the systematic encoding (Blocks 650-680) of the physical TMV using TMCB content and its subsequent transmission (Block 690) to target systems for autonomic threat management processing. TMV encoding may involve a cascading nested sequence of encode operations 650, 660, 670, 680 for a given vulnerability 650 such that each affected system type 652 is identified, and for each of these 662, each affected level 670 is identified, and for each of these 672 all applicable countermeasures 680 are encoded in machine-readable format, as shown in FIG. 6. A similar cascading nested sequence of encode operations may be performed likewise for affected subsystems.

Figure 7:
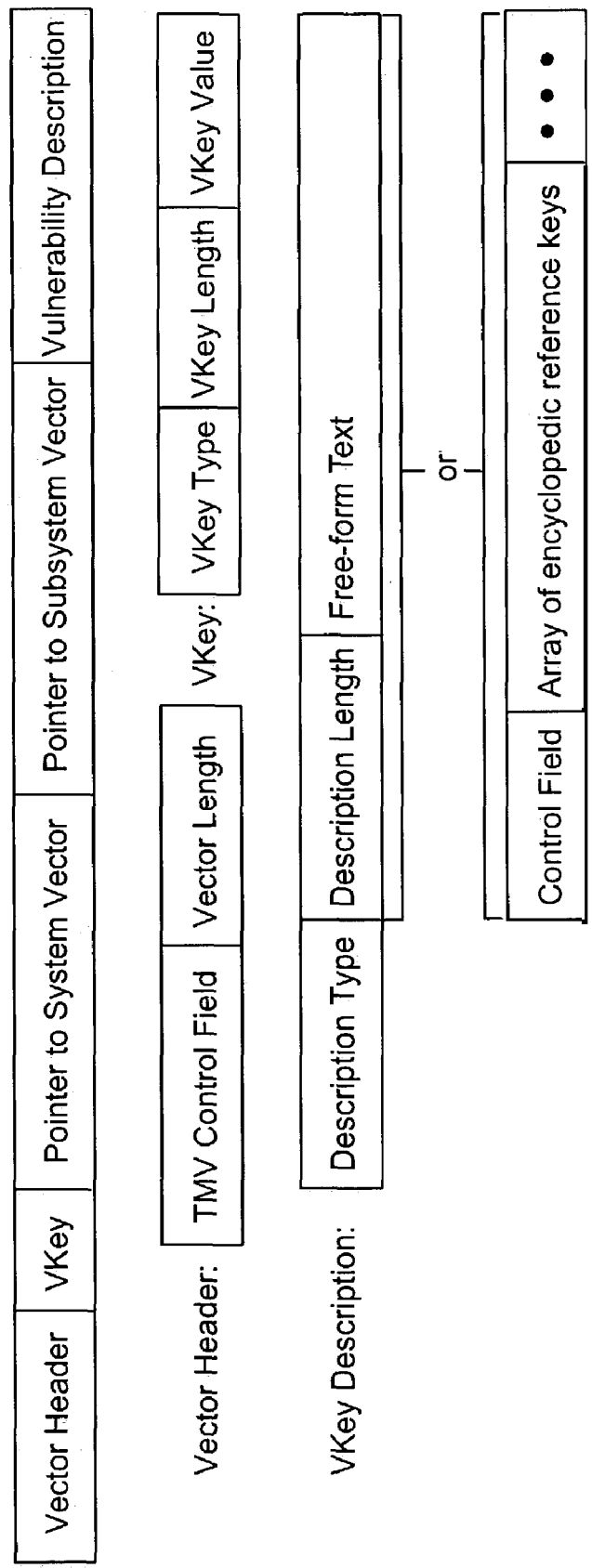

FIG. 7 illustrates a general form of a TMV according to some embodiments of the present invention. As was described above, the TMV can transform the computationally ambiguous information, such as CVE information and/or other information, into a precise specification of vulnerability attributes and countermeasure attributes. The resultant encoding can then be used by programs to automate the reconciliation of threat specifics to a well-defined set of compensating countermeasures to be applied to specific target computer systems.

As shown in FIG. 7, a TMV according to some embodiments of the present invention may include a Vector Header, a VKey, such as a CVE Key, a Pointer to System Vector, a Pointer to a Subsystem Vector and a VKey Description. It will be understood that CVE is used herein as one example of a vulnerability key (VKey), but that any other key(s) may be used. It also will be understood that the VKey Description may be a free form text description and/or an encyclopedic reference key to a text description held elsewhere, and may be included in the vector header as a usability aid. As also shown in FIG. 7, the Vector Header may include a TMV Control field and a Vector Length field. The VKey field may include VKey Type, VKey Length and VKey Value fields. Finally, the VKey Description may include a Description Type, Description Length and free form text, or a Control field and an Array of encyclopedic reference keys. FIGS. 8-12 provide detailed descriptions of the System Vector, System Level Vector, Countermeasures Vector, Countermeasures Metadata and Subsystem Vector.

Figure 8:
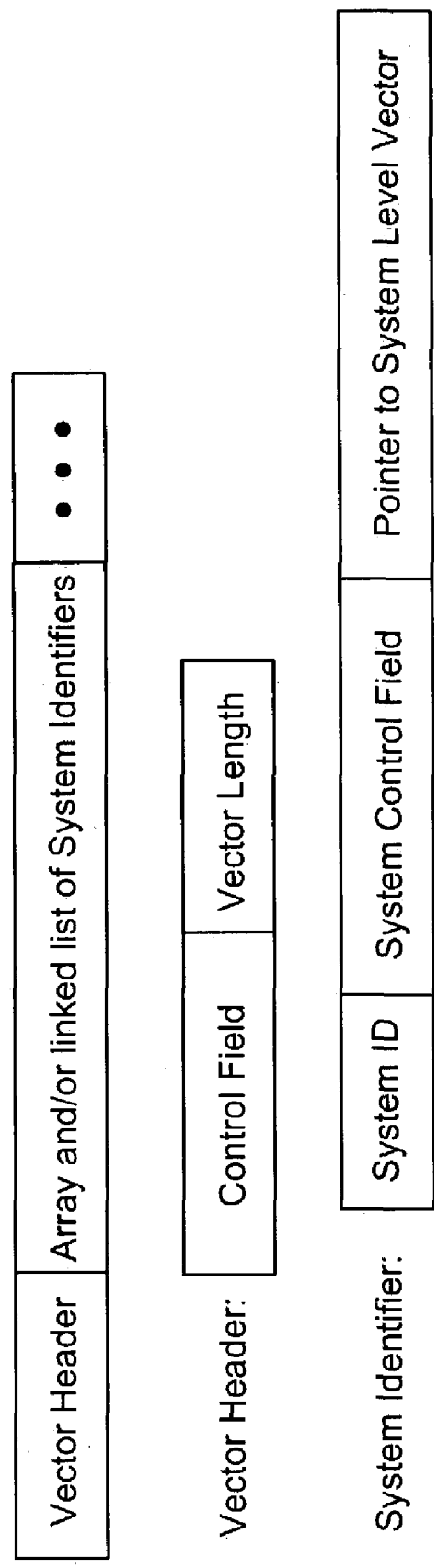

FIG. 8 illustrates a general form of the System Vector according to some embodiments of the present invention. The System Vector identifies the Operating System (OS) type(s) to which a vulnerability applies. It may include a Vector Header and an array and/or linked list of System Identifiers corresponding to specific OS types, such as Sun Solaris, AIX, etc. As also shown in FIG. 8, the Vector Header may include a Control field and a Vector Length field. The System Identifier can include a System ID field, a System Control field and a Pointer to System Level Vector field. The System Control Field is used to maintain system oriented processing controls. System IDs are globally unique codes which map to specific operating system types. The code values and the correspondence to their conventional system names are maintained in machine-readable form in a common semantics database, referred to as a Threat Management Control Book (TMCB), described below.

Figure 9:
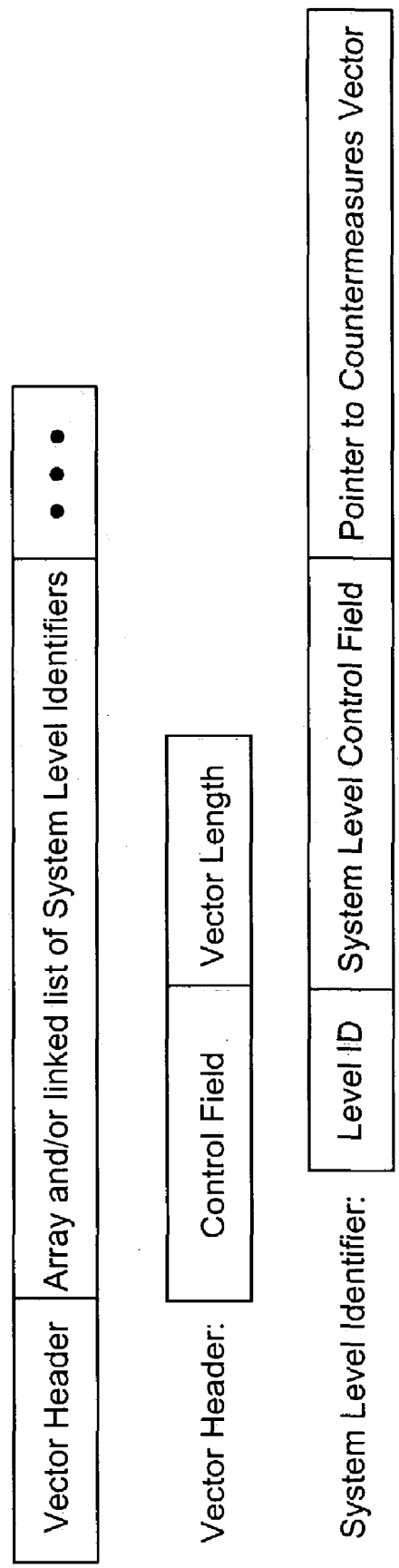

FIG. 9 illustrates a general form of the System Level Vector. As shown in FIG. 9, the System Level Vector may include a Vector Header and an array and/or linked list of System Level Identifiers. The Vector Header may include a Control field and a Vector Length field. The System Level Identifier may include a Level ID field, a System Level Control field, and a Pointer to a Countermeasures Vector. The System Level Vector identifies the specific operating system version and release levels to which a vulnerability or countermeasure applies. The System Level Control field is used to maintain system level directed processing controls. Level IDs are system-wide unique codes which map to specific operating system versions and release levels. The code values and the correspondence to their conventional product version and release names are maintained in machine-readable form in the TMCB as will be described below.

FIG. 10 illustrates a general form of a Countermeasures Vector according to some embodiments of the present invention. As shown in FIG. 10, the Countermeasures Vector may include a Vector Header and an array and/or linked list of Countermeasures Data. The Vector Header may include a Control field and a Vector Length field. The Countermeasures Metadata may include a Countermeasures (CM) ID, a CM Type, a CM Control field and CM Parameters. The Countermeasures Vector identifies the specific countermeasures applicable to a specific version or release level of a specific operating system (system) or application (subsystem) version, in order to counteract the vulnerability. The countermeasures vector thus identifies a locus of points in the TMV subspace, as located by the directed graph formed by the System Vector, Level Vector and/or Subsystem Vector, Subsystem Level Vector, representing the applicable set of countermeasures such as patches.

FIG. 11 illustrates a general form of Countermeasure Metadata of FIG. 10. Countermeasure Metadata provides the information that is used to apply a countermeasure. Referring to FIG. 11, CounterMeasure ID (CMID) is a globally unique code which maps to a specific countermeasure, as defined in the TMCB (described below). CM Type and CM Parameters permit the specification of countermeasure installation instructions. Examples of CM Types might include "local", "server", "URL", "Binary" or "manual", representing various modes of countermeasure installation. The CM Control Field is used to maintain processing controls associated with countermeasure deployment. Examples of CM Parameters might include metadata representing interface parameters to a local or remote patch application service, a URL, embedded countermeasure installation instructions (text) and/or an encyclopedic reference to same. The specific control mechanisms for specification of CM Parameters and installation of countermeasures is a function of the individual countermeasures themselves, and need not be described herein.

Figure 12:
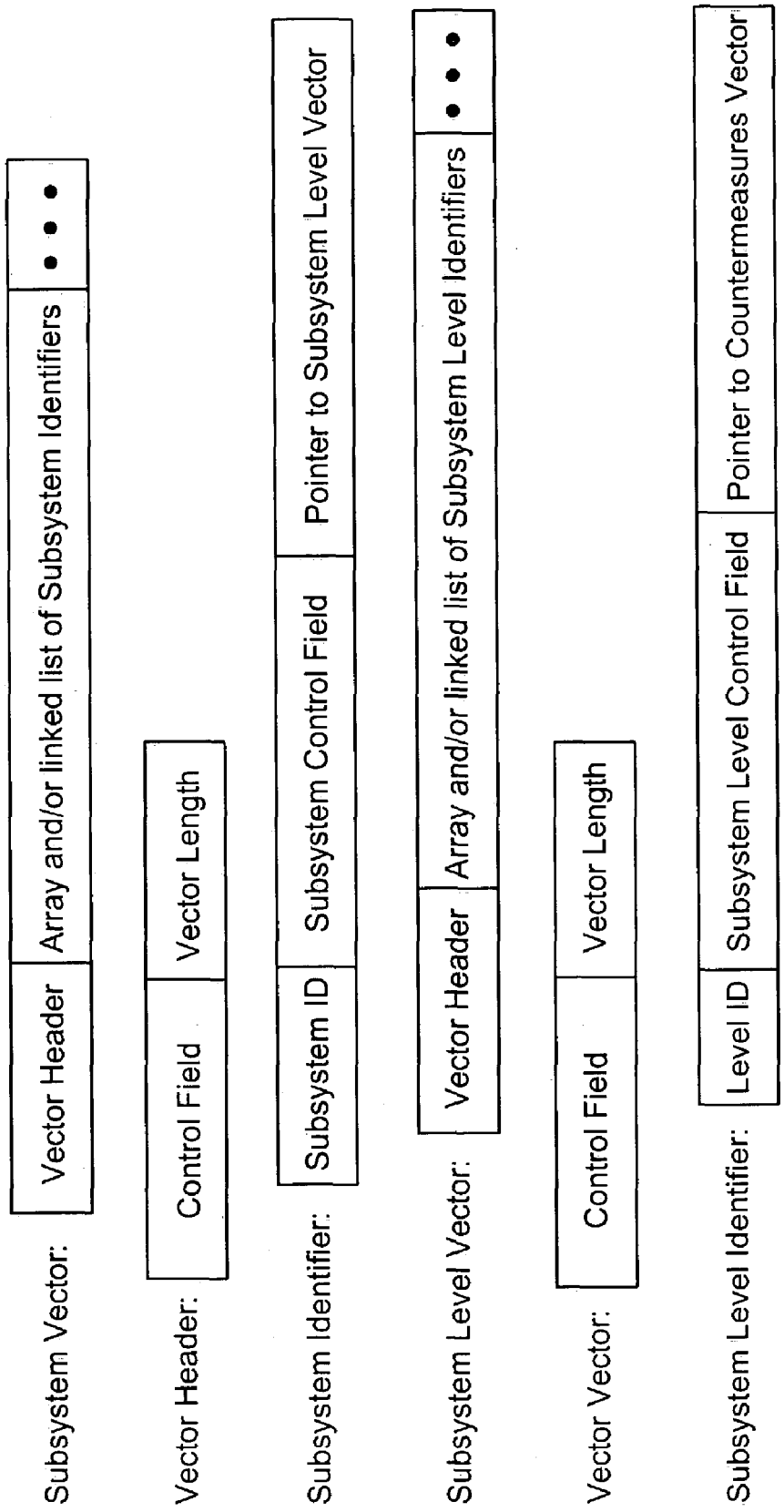

FIG. 12 is an overview of a Subsystem Vector. As was described above, security vulnerabilities may involve not only operating systems but also subsystems, such as protocol engines, applications programs and utilities. The Subsystem Vector identifies the subsystems or application types to which a vulnerability applies. It includes an array of system identifiers corresponding to specific software entities, such as Microsoft IIS. The Subsystem Vector can be structurally identical to the System Vector, except that it applies to application software that uses the operating system, as opposed to the operating system itself. It also will be understood that the semantics of the Countermeasures Vector elements may be repeated in the subsystem vector taxonomy.

FIG. 13 illustrates a general form of a Threat Management Control Book (TMCB) according to some embodiments of the present invention, which may correspond to the common semantics database 530 of FIG. 5. As was already described, the TMCB includes an indexing structure containing the metadata associated with the standard values used in the TMV encoding. It enables the transformation of nonstandard or bulky information into unambiguous and compact equivalent forms, for packaging in a TMV. Such data transforms are established by a Threat Management Assigned Number Authority (TMANA). In general, the TMCB is the registry of standard values encoded in TMV configurations.

FIG. 13 illustrates tables that can be maintained in the TMCB. As shown in FIG. 13, the system table may include a System ID, a System Name, and a System Level Table field, and may be indexed by System ID and System Name. The System Level Table may include a Level ID and a Version and Release Number field. The Subsystem Table may include a Subsystem ID, Subsystem Name and Subsystem Level Table, and may be indexed by Subsystem ID and Subsystem Name. The Threat Severity Table may include a Severity ID and a Severity Name field, and may be indexed by the Severity ID and Severity Name. The Countermeasure Table may include a CM ID, CM Type and CM Name field, and may be indexed by the CM ID, CM Type and CM Name fields. It will be understood, however, that these tables are merely illustrative and other configurations may be provided in other embodiments of the invention.

Figure 14:
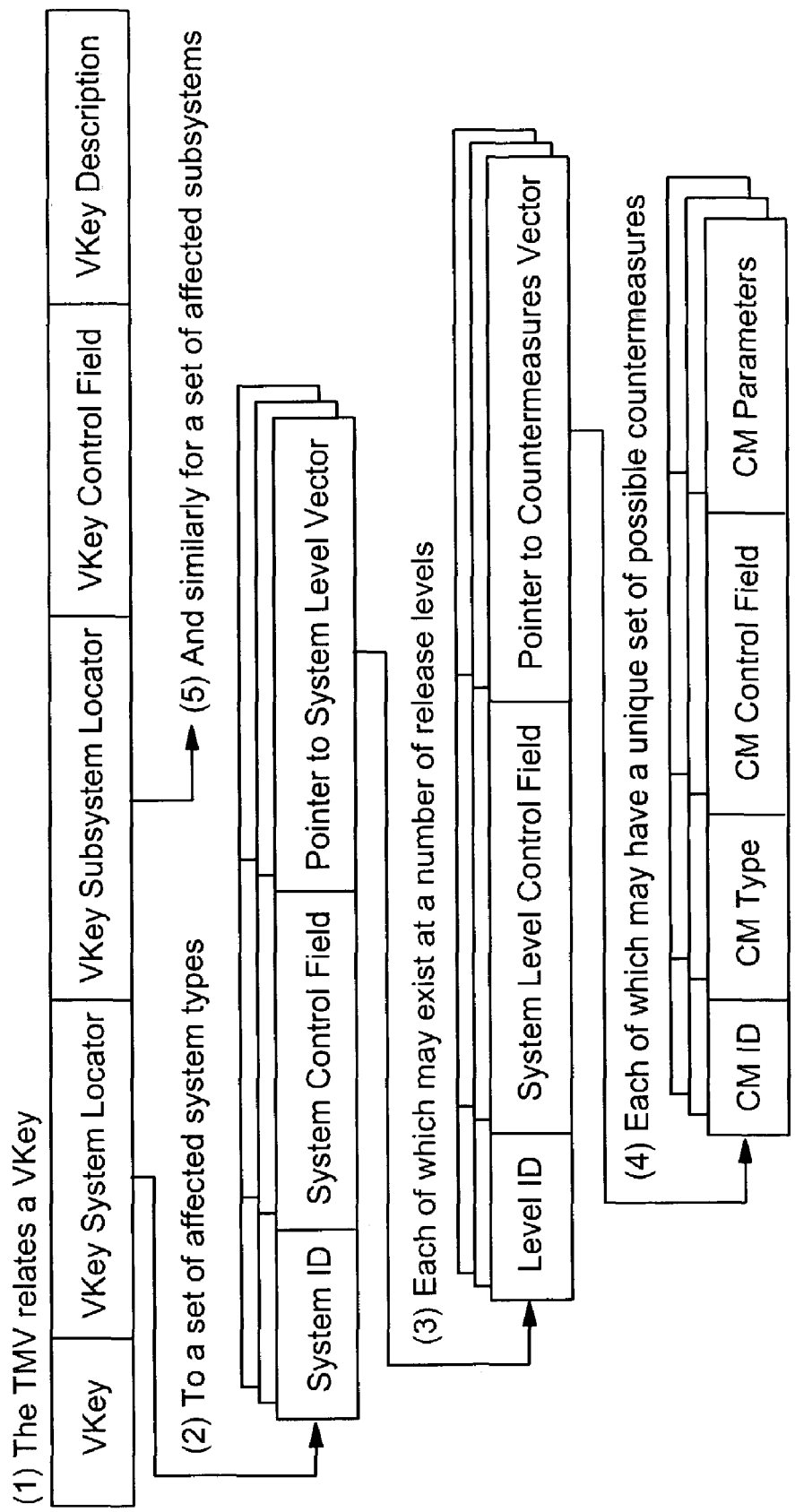

FIG. 14 provides a summary of TMV taxonomy that was described in detail in FIGS. 7-12.

As was described above, embodiments of the present invention can consolidate the human interpretation of threat management information to a single point, establish an unambiguous representation of the information using a common semantic information base, and produce a computer-actionable message unit (TMV) suitable for use by an automated threat management system. Vulnerable systems may then identify themselves, apply appropriate countermeasures, track state and engage System Security Administrators (SSAs) only on an "intervention required" basis.

Figure 15:
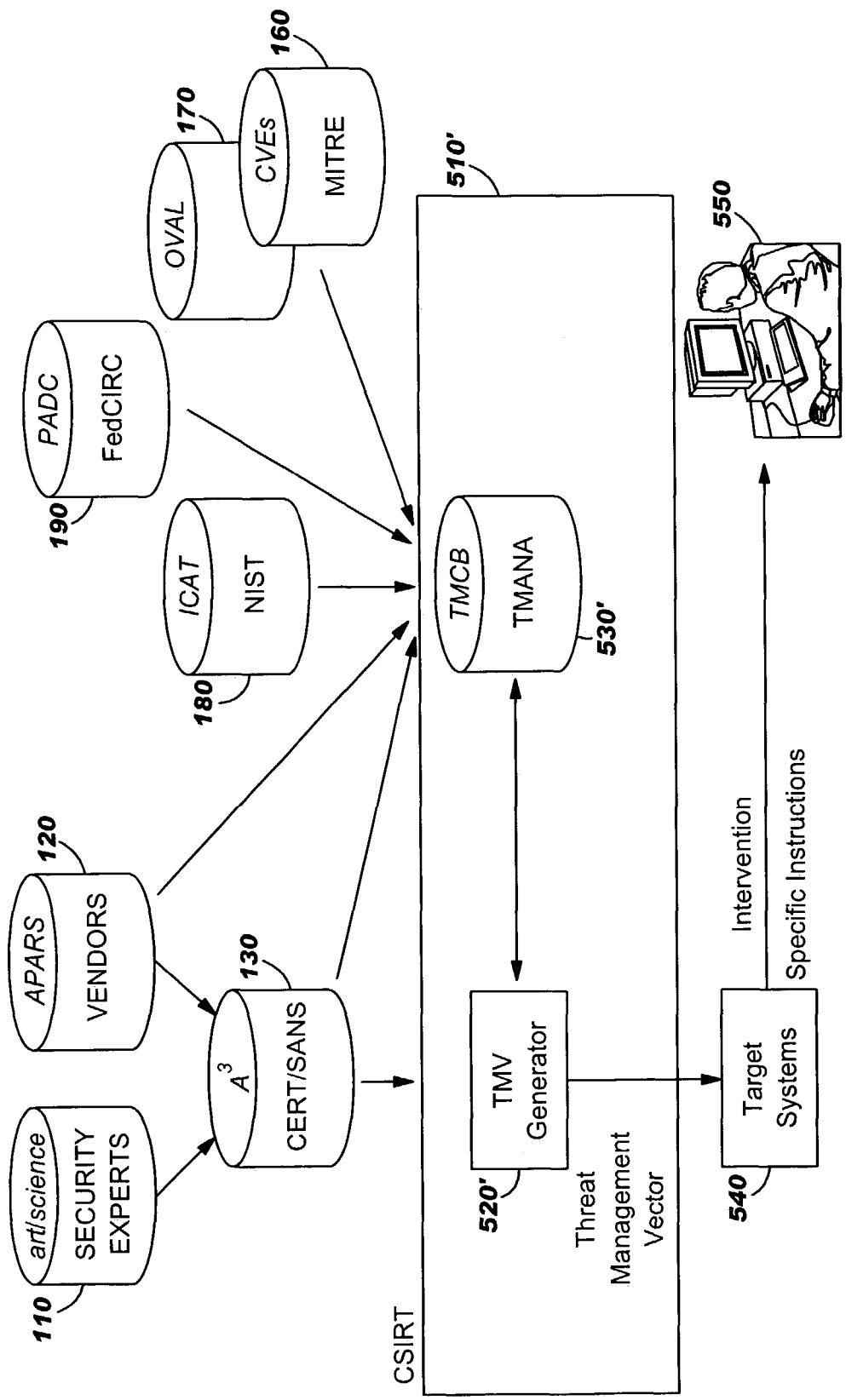
FIG. 15 is a block diagram of systems, methods and/or computer program products for generating computer-actionable computer threat management information according to other embodiments of the present invention.

FIG. 15 is a block diagram of systems, methods and computer program products for generating computer-readable computer security threat management information according to other embodiments of the present invention. In FIG. 15, the functionality of the message encoder 520 of FIG. 5 is provided by a TMV generator 520', and the functions of the common semantics metadata 530 is replaced by the TMANA 530', in a CSIRT or central clearing house 510'.

Referring to FIG. 15, the TMV generator 520' transforms vulnerability, threat and APAR information via human analysis and computer-assisted encoding, into an unambiguous computer interpretable form, the TMV. The TMV generator 520' references a set of standard encodings maintained by the TMANA 530' in the form of the TMCB (FIG. 13). While the TMANA 530' maintains the referential integrity of the TMCB, the actual task of assigning values to the standard encodings may be relegated to an external assigned numbers authority, such as NIST. The TMV in computer-readable format is provided to target systems 540. For each specific vulnerability, threat or countermeasure, the TMV stipulates target system components and parameterized countermeasure installation instructions permitting automated application of countermeasures at target computer systems.

In view of the above, some embodiments of the present invention can reduce the need for extensive threat management research and analysis from many points, such as each and every SSA 550, to one point, such as the TMV generator 520'. This can reduce the labor associated with threat management at the operational threat analysis level. Moreover, through its introduction of standard encodings of key data, embodiments of the invention can permit threat management activities at target systems to be automated. This can further reduce the labor associated with threat management at the operational security maintenance level.

Administering Computer Security Threat Countermeasures for Computer Systems

Figure 16:
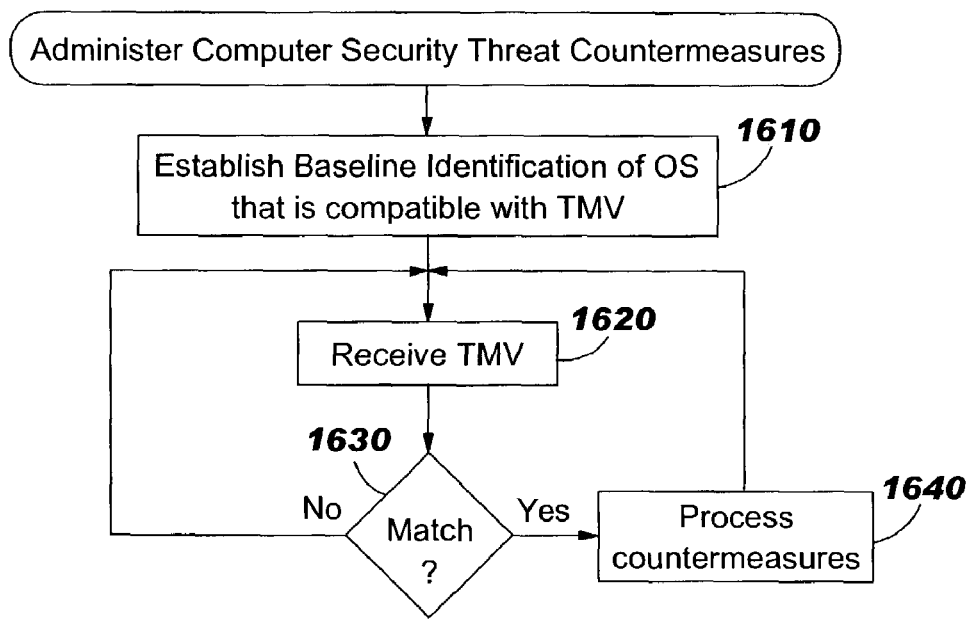
FIG. 16 is a flowchart of operations that may be performed to administer a computer security threat countermeasure according to embodiments of the present invention.

FIG. 16 is a flowchart of operations that may be performed to administer computer security threat countermeasures for a computer system according to some embodiments of the present invention. These operations may be performed in a target system, for example, one of the target systems T of FIG. 2 or one of the target systems 540 of FIG. 5 or 15.

Referring now to FIG. 16, at Block 1610, a baseline identification of an operating system type and an operating system release level for the computer system is established, which is compatible with a TMV. At Block 1620, a TMV is received including therein a first field that provides identification of at least one operating system type that is affected by a computer security threat, a second field that provides identification of an operating system release level for the operating system type, and a third field that provides identification of a set of possible countermeasures for an operating system type and an operating system release level. In other embodiments, the TMV may also include a fourth field that provides identification of at least one application program type that is affected by the computer security threat and a fifth field that provides identification of a release level for the application program type. In these embodiments, the third field also provides identification of a set of possible countermeasures for an application program type and an application program release level. In still other embodiments, the TMV may include a sixth field that provides identification of the computer security threat.

Continuing with the description of FIG. 16, at Block 1630, a determination is made as to whether the TMV identifies the operating system type and operating system release level and/or the application program type and application program release level for the computer system as being affected by the computer security threat. If yes, then countermeasures that are identified in the TMV are processed at Block 1640. If not, then receipt of a new TMV is awaited.

Figure 17:
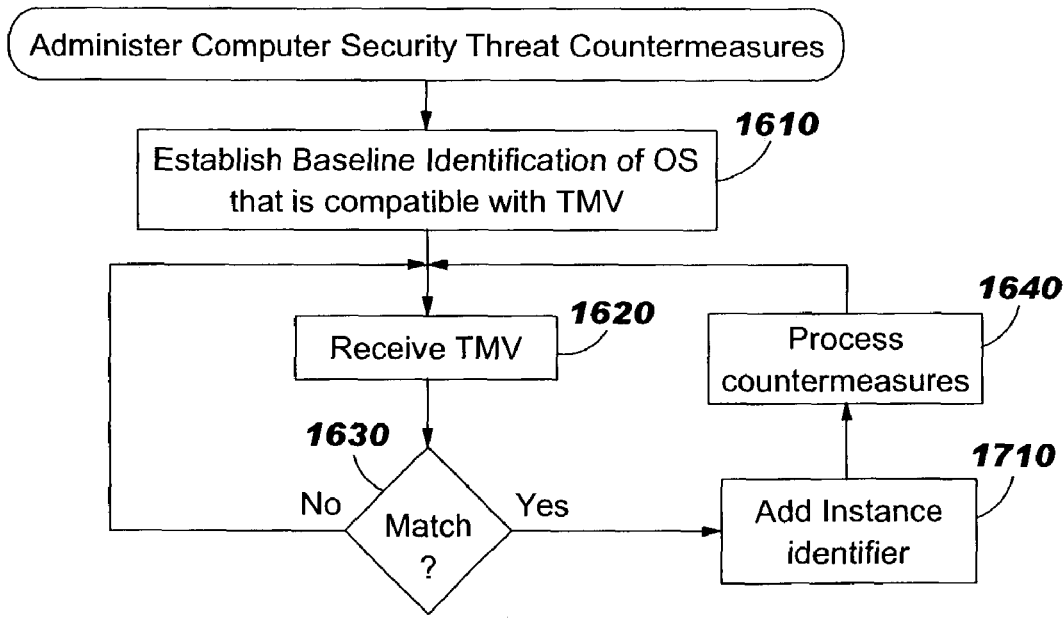
FIG. 17 is a flowchart of operations that may be performed to administer a computer security threat countermeasure according to other embodiments of the present invention.

FIG. 17 is a flowchart of operations that may be performed to administer computer security threat countermeasures according to other embodiments of the present invention. Referring to FIG. 17, a baseline identification is established at Block 1610, and a TMV is received at Block 1620. If a match occurs at Block 1630, then at Block 1710, at least one instance identifier is added to the TMV to account for multiple instances of the operating system and/or the application program on board the computer system. Countermeasures are then processed at Block 1640 for the instance of the operating system type and operating system release level and/or the application program type and application program release level when the operating system and/or application program is instantiated in the computer system. Accordingly, these embodiments of the invention can take into account that, in a single computer system, multiple instances of operating systems and/or application programs may be present.

Figure 18:
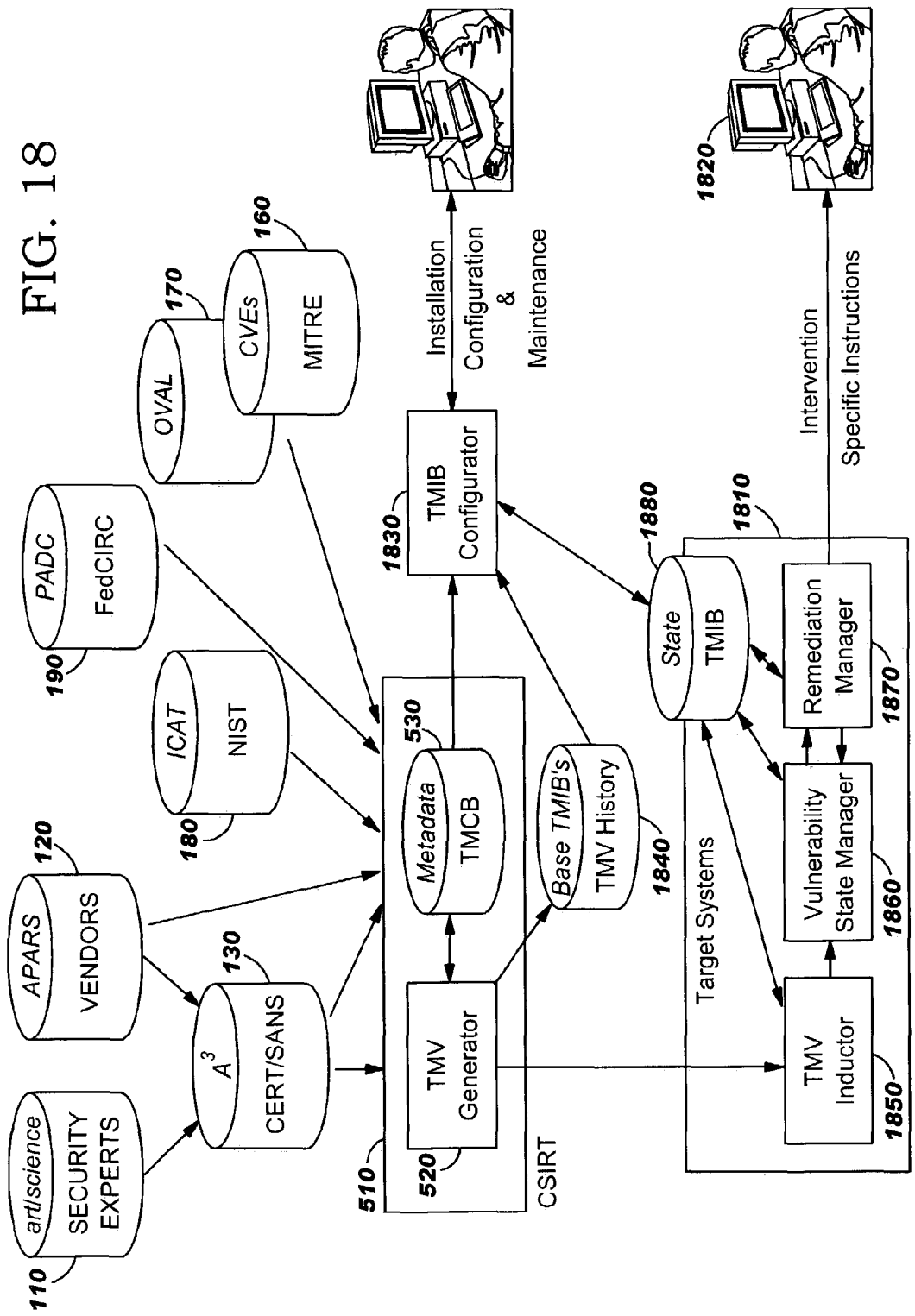
FIG. 18 is a block diagram of systems, methods and computer program products according to other embodiments of the present invention.

FIG. 18 is a block diagram of systems, methods and computer program products according to other embodiments of the present invention. As shown in FIG. 18, based on TMV input and tightly coupled side data, a target system 1810 can identify itself as vulnerable to a specific threat or needing a specific countermeasure, automatically initiate appropriate countermeasures, track state and engage security system administrators 1820 on an "intervention required" basis.

Still referring to FIG. 18, at the initiation of security administration personnel or automatic equivalents, a Threat Management Information Base (TMIB) configurator 1830, which utilizes standard values from a Threat Management Control Book (TMCB) 530 of FIG. 13, also referred to as a common semantics database 530 of FIG. 5, also referred to as tightly-coupled side data, establishes a baseline identity and vulnerability state of a target system 1810 using a TMV-compatible information structure and a TMV history file 1840 that is maintained by the TMV generator 520 of FIG. 13, also referred to as a message encoder 520 of FIG. 5.

Still referring to FIG. 18, upon receipt of a new TMV, a TMV inductor 1850 checks the TMIB to see if any onboard system/subsystem images are affected. If so, the TMV inductor 1850 prunes the TMV of nonrelevant TMV subvectors and forwards it to a Vulnerability State Manager (VSM) 1860 for processing.

The VSM 1860 incorporates the new vulnerability or countermeasure information into the TMIB 1880 and, using state information from the TMIB 1880, if any relevant system or subsystem images are active (instantiated), invokes the Remediation Manager (RM) 1870 to oversee the application of the indicated countermeasures. During the remediation, the remediation manager 1870 interacts with the TMIB 1880 to maintain current vulnerability state and countermeasure application. The VSM 1860 may similarly invoke the Remediation Manager 1870 upon system/subsystem initial program load. Accordingly, a self-healing capability can be provided in computer systems with respect to security threat management.

Figure 19:
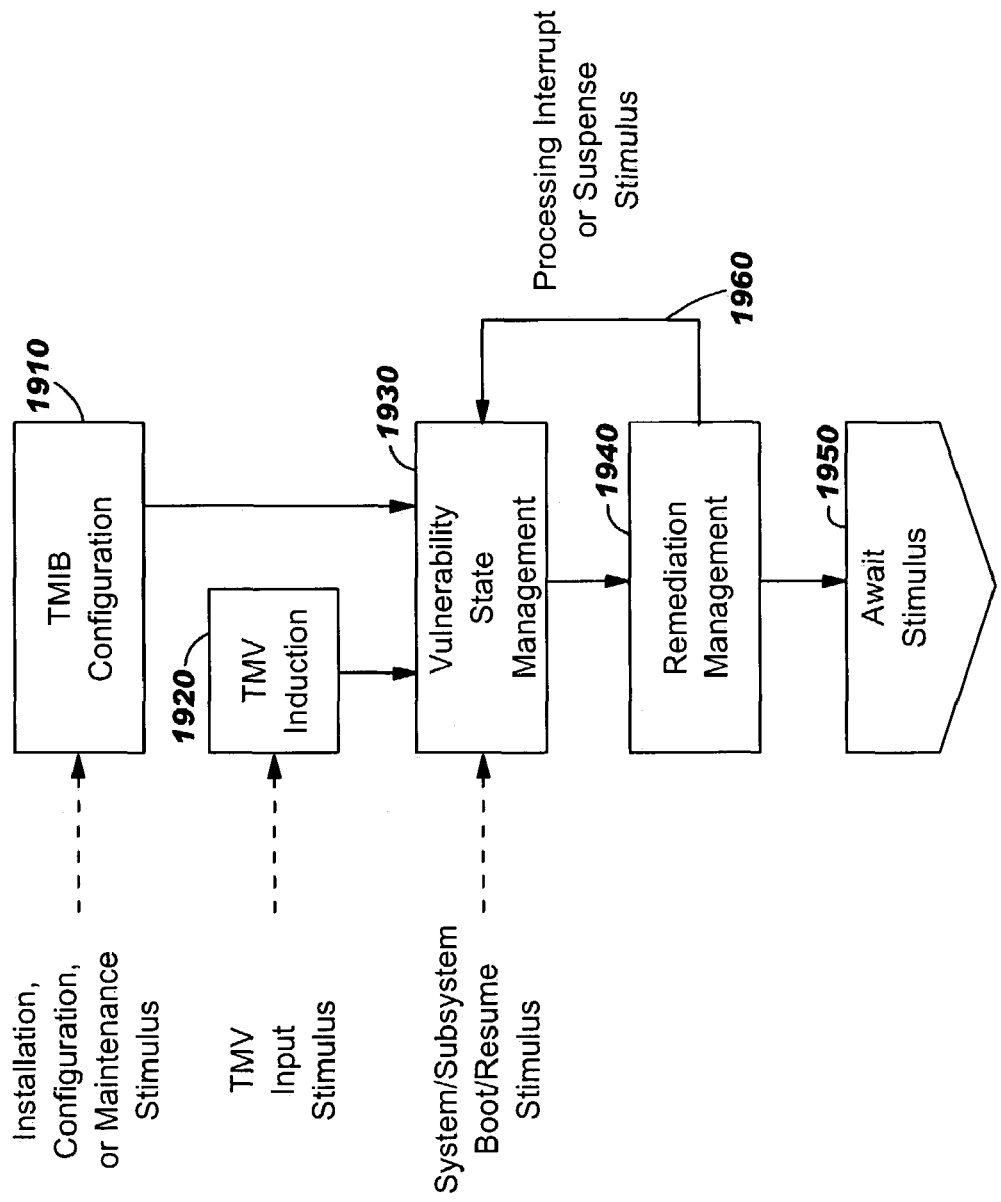
FIG. 19 is a flowchart of operations that may be performed to administer a computer security threat countermeasure according to yet other embodiments of the present invention.

FIG. 19 is a flowchart of operations that may be performed to administer computer security threat countermeasures to a computer system according to other embodiments of the present invention, and will refer to the block diagram of FIG. 18. Referring to FIG. 19, at Block 1910, TMIB configuration is performed upon receipt of an installation, configuration or maintenance stimulus. TMIB configuration can obtain all prior countermeasures for the system, also referred to as a TMV history file, so that the system can be brought up to date against all prior security threats. TMIB configuration will be described in detail below. At Block 1920, TMV induction is performed in response to a new TMV input stimulus, as will be described below. At Block 1930, whether in response to TMIB configuration Block 1910, TMV induction Block 1920, or a system/subsystem boot or resume stimulus, vulnerability state management of Block 1930 is performed to allow all TMVs to be processed. Remediation management is performed at Block 1940 to process the countermeasures that are identified in the TMVs. Vulnerability state management 1930 may maintain the proper state of the computer system even upon occurrence of a processing interrupt or suspense stimulus 1960. After remediation management is performed at Block 1940, a new stimulus such as an installation configuration or maintenance stimulus, a TMV input stimulus, a system/subsystem boot/resume stimulus or a processing interrupt or suspense stimulus is awaited at Block 1950.

TMIB configuration according to some embodiments of the present invention now will be described. TMIB configuration may be performed by TMIB configurator 1830 of FIG. 18, and/or the TMIB configuration Block 1910 of FIG.

19. TMIB configuration can build an information structure that definitively specifies an initial and continuing software configuration and vulnerability state of a target system, such that the TMIB 1880 is readily usable for computation comparison with a subsequent inbound TMV to determine whether or not the target system is one of the system or subsystem types to which the TMV should be directed. This can provide rapid recognition, to efficiently match TMV system/subsystem type and level information with on-board system/subsystem type and level information. Moreover, remediation management based on initial TMIB configuration can be virtually identical to the subsequent processing of inbound TMVs during steady state operation, to allow computational consistency.

In some embodiments, the initial configuration of the TMIB 1880 can be computationally equivalent to that derived by processing TMVs with all the vulnerability and countermeasure information to establish an initial non-vulnerable state. Stated differently, all countermeasures historically identified as relevant to the system/subsystem being initialized can be applied, in bulk mode. Subsequent inbound TMV information can then be incorporated into the TMIB 1880 by a simple computational means due to notational consistency.

Thus, according to some embodiments of the present invention, the TMV generator 520, upon issuing TMVs, maintains a history file 1840 in the form of TMIB entries representing the history of applicable countermeasures for applicable vulnerabilities to applicable systems and subsystems. TMIB fabrication, the construction of TMV history file entries, and the TMV induction operation can all be closely related. In particular, they can all involve well-defined transforms on the TMV structure, as described below.

Figure 20:
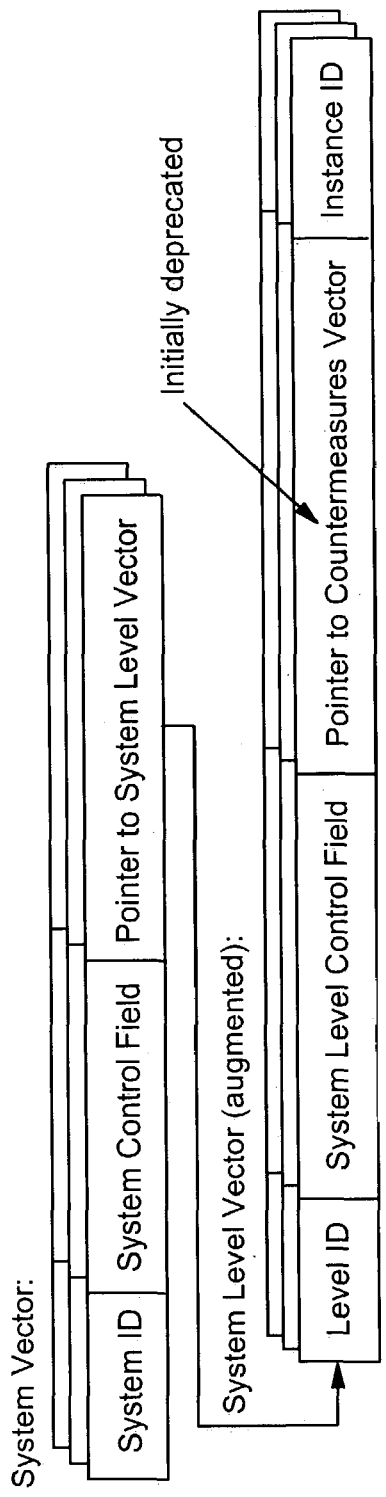
FIGS. 20-22 illustrate threat management vectors according to embodiments of the present invention as they undergo TMV mutation according to embodiments of the present invention.
Figure 21:
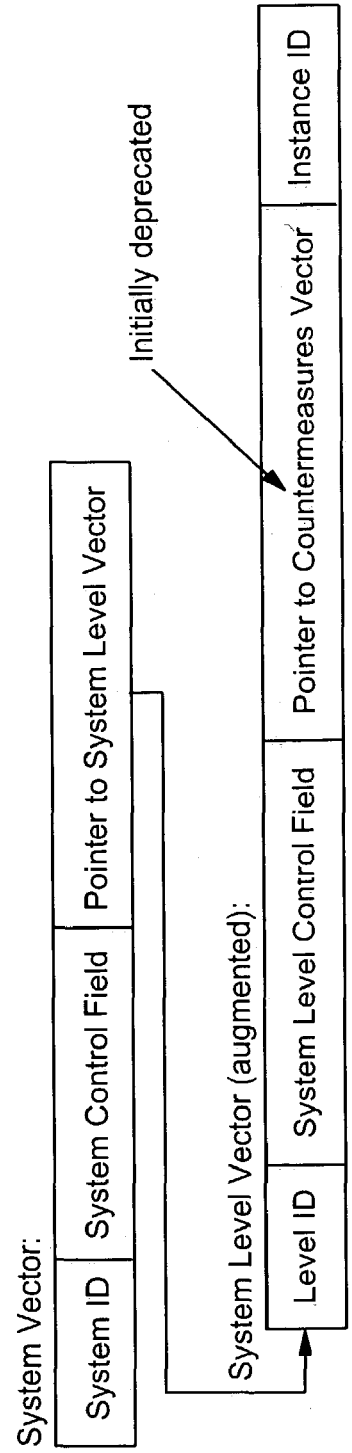
Figure 22:
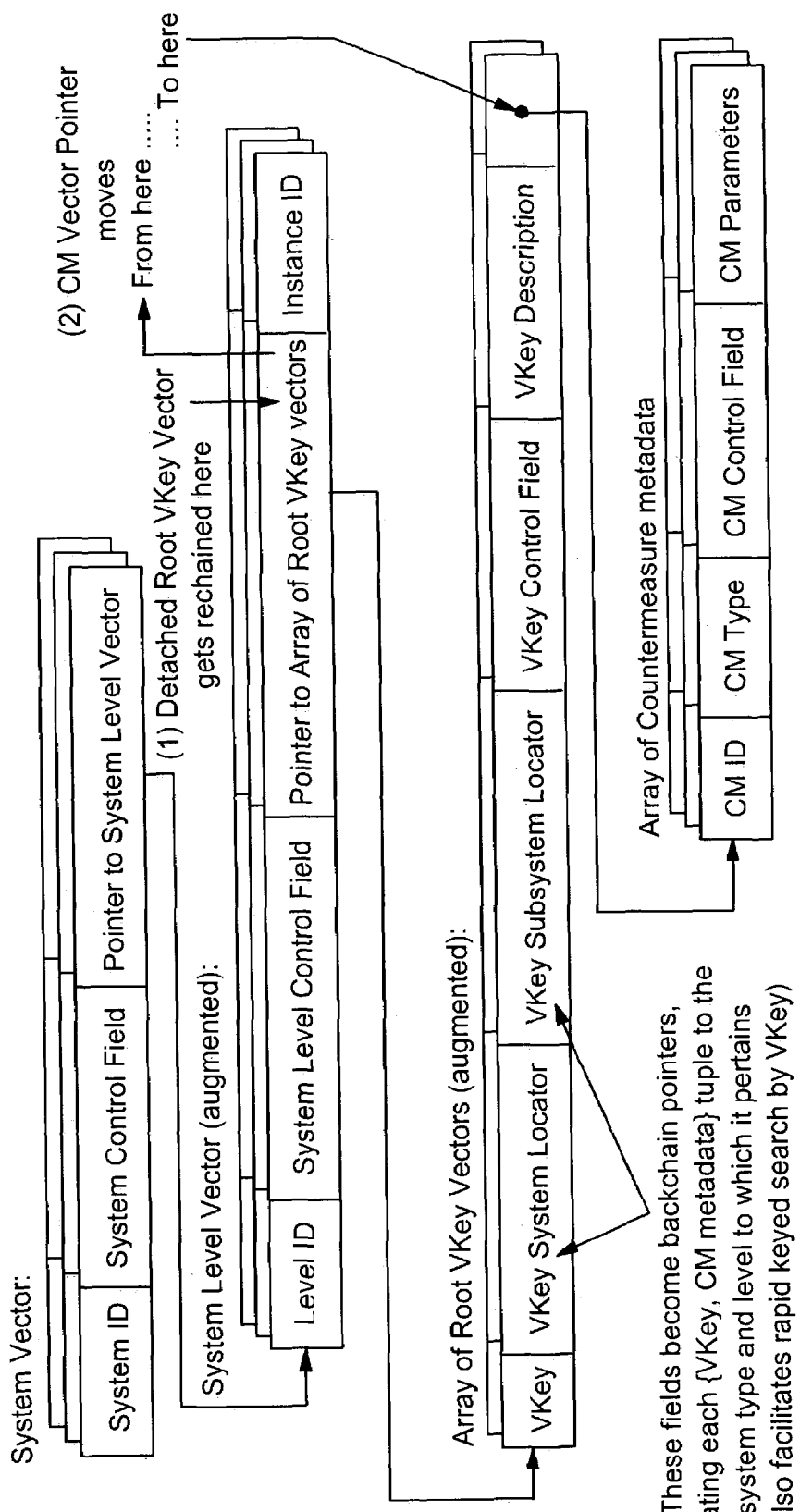

TMIB generation may take place using a process, referred to herein as "TMV mutation", as described in FIGS. 20-22. As shown in FIG. 20, a system vector (for operating systems), or subsystem vector (for applications), is extracted from the root TMV. Moreover, the subordinate system level vector is augmented with an "instance ID" field, to represent a specific system instance, such as a host name and/or IP address. This forms a virgin TMIB structure that identifies a system or subsystem. It will be understood that FIG. 20 illustrates the system vector case, but a similar taxonomy may be used for a subsystem vector.

The taxonomy shown in FIG. 20 can represent a highly sophisticated system. For example, the system illustrated in FIG. 20 has three bootable system types with three available boot images of the first system type, one for each of three release levels of that system type. Machine architectures supporting multiple concurrent Logical PARtitions (LPAR) may fall into this categories. Systems with multiple boot images may be somewhat simpler. The simplest systems have a single boot image, as depicted in FIG. 21.

As shown in FIG. 22, the root VKey vector is then rechained by replacing the countermeasures vector with a pointer to an array of root Vkey vectors and augmenting each root VKey vector with a countermeasures vector pointer field. This creates the basic structure of a TMV history record, a TMIB fully populated with VKey, and countermeasure state data, and an inducted TMV as shown in FIG. 22. It will be understood that FIG. 22 shows the data structure for a system. However, a structure for a subsystem can be similar. In practical effect, the TMV mutation can transform the TMV from a desired language of a sender to a desired language of a receiver.

Figure 23:
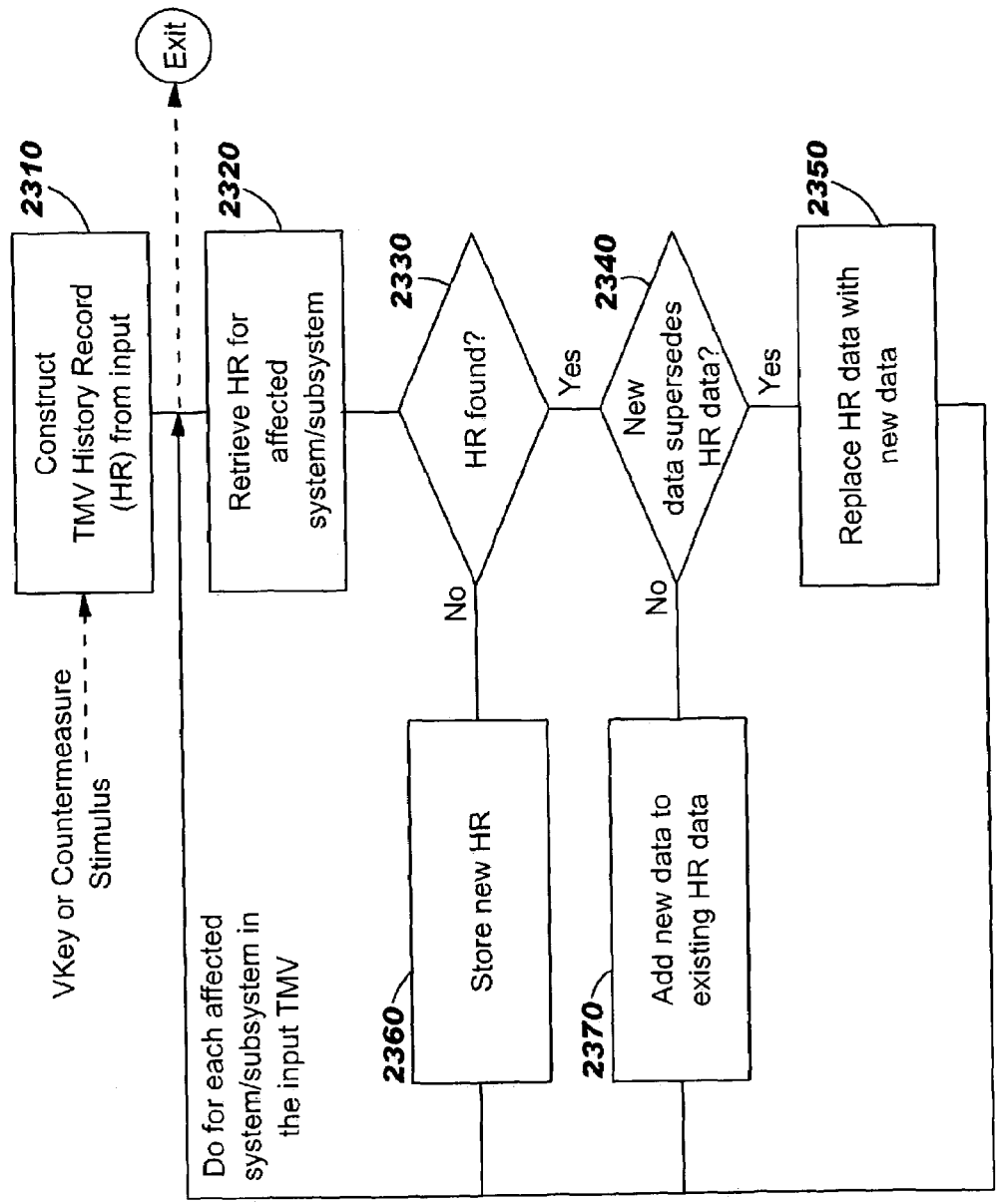
FIG. 23 is a flowchart of operations that may be performed for TMV history file maintenance according to embodiments of the present invention.

FIG. 23 is a flowchart of operations that may be performed for TMV history file maintenance according to embodiments of the present invention. These operations may be performed by the TMV generator 520 of FIG. 18. Referring to FIG. 23, at Block 2310, a TMV History Record (HR) is constructed from a VKey or countermeasure stimulus. At Block 2320, an HR is retrieved for the affected system or subsystem. If an HR is found at Block 2330, and if the new data supercedes the HR data at Block 2340, then the HR data is replaced with the new data at Block 2350.

These operations are performed for each affected system/subsystem in the input TMV. If an HR is not found at Block 2330, then the new HR is stored at Block 2370. If the HR was found at Block 2330, but the new data does not supercede the HR data, then the new data is added to the existing HR data at Block 2360.

Figure 24:
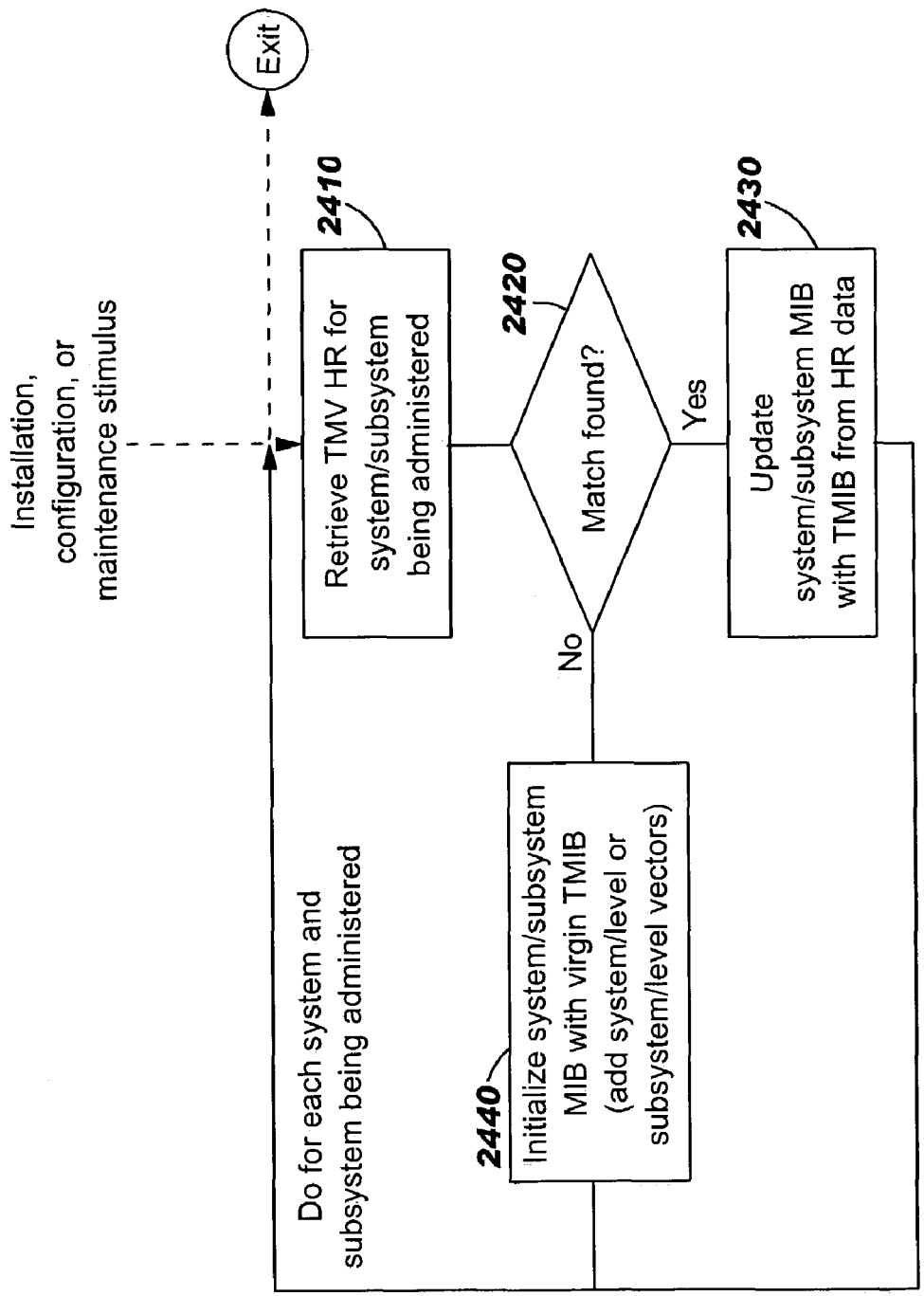
FIG. 24 is a flowchart of operations that may be performed for TMIB configuration according to embodiments of the present invention.

Referring now to FIG. 24, operations for TMIB configuration will now be described according to embodiments of the present invention. These operations may be performed by the TMIB configurator 1830 of FIG. 18 and/or by TMIB configuration Block 1910 of FIG. 19. Referring now to FIG. 24, upon occurrence of an installation, configuration or maintenance stimulus, the TMV HR for the system/subsystem being administered is retrieved at Block 2410. If an HR is found at Block 2420, then the system/subsystem MIB is updated with the TMIB from the HR data at Block 2430. The update may be performed so as not to corrupt existing relevant vulnerability state management information for the system/subsystem. If not, then at Block 2440, the system or subsystem MIB is initialized with a virgin TMIB. The operations of Blocks 2410-2440 are performed for each system and subsystem that is being administered.

Figure 25:
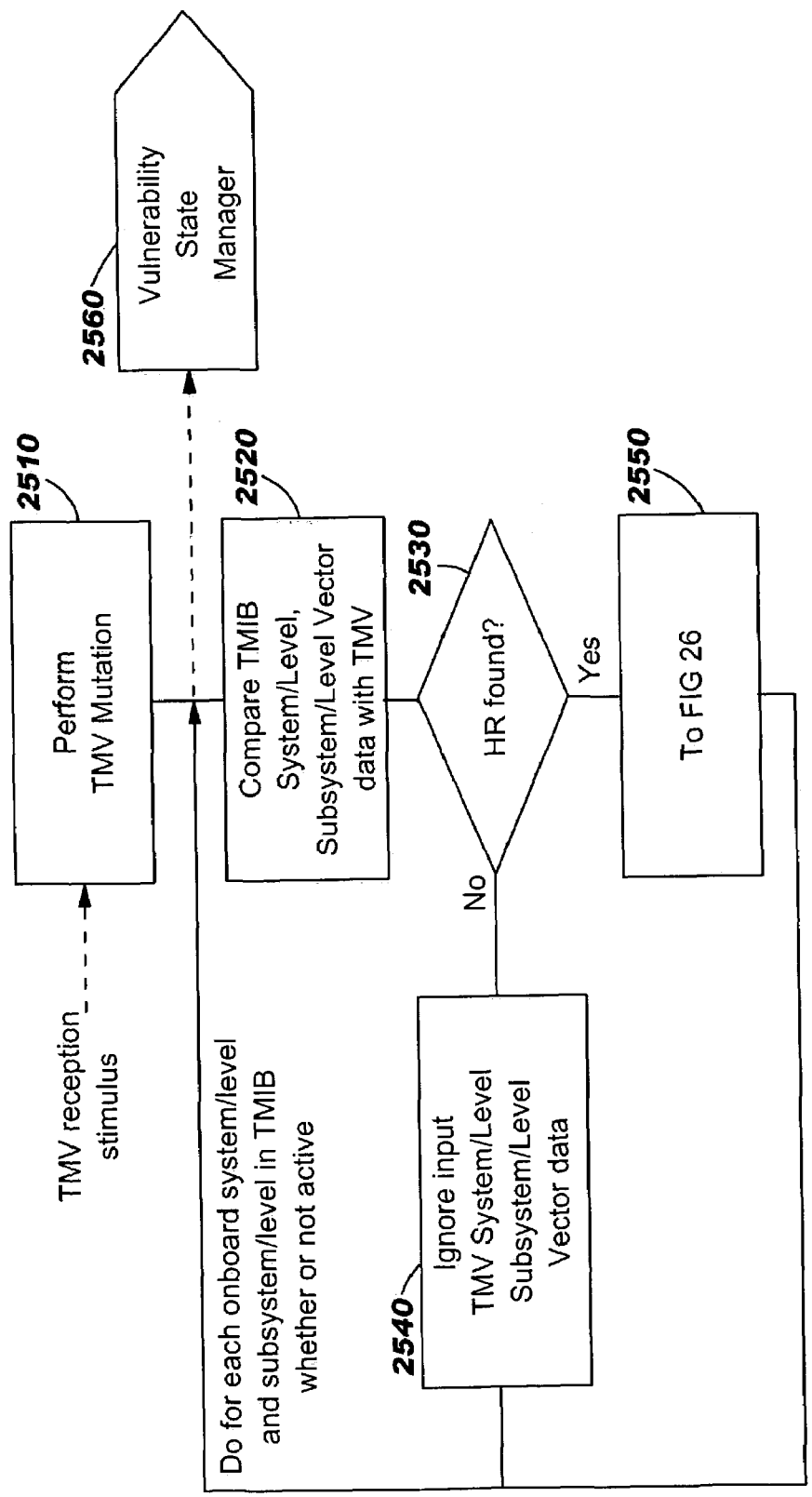
FIGS. 25 and 26 are flowcharts of operations that may be performed for TMV induction according to embodiments of the present invention.
Figure 26:
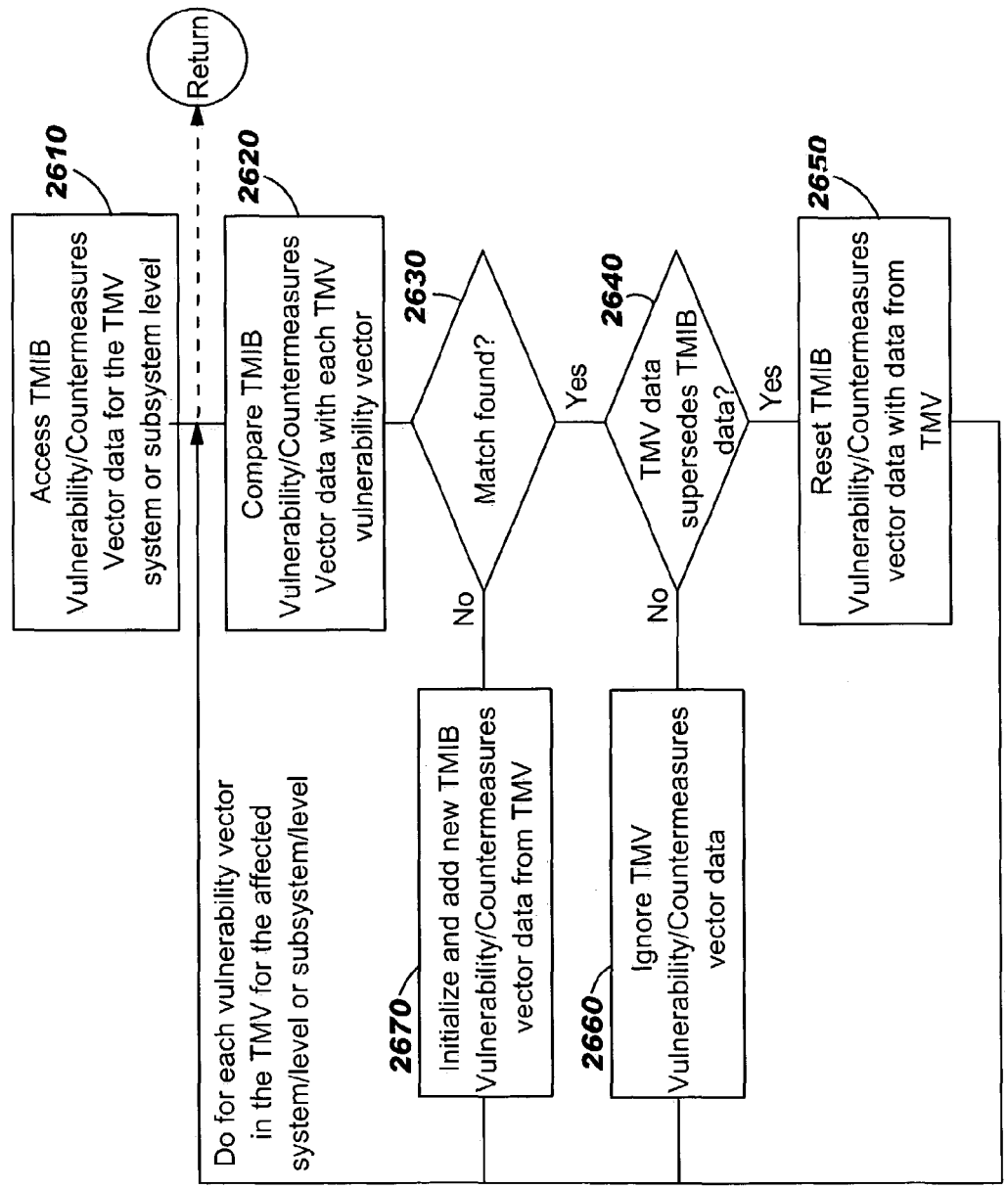

FIGS. 25 and 26 are flowcharts of operations that may be performed for TMV induction according to embodiments of the present invention. These operations may be performed by TMV inductor 1850 of FIG. 18 and/or TMV induction Block 1920 of FIG. 19. Referring now to FIG. 25, upon receipt of the TMV stimulus, TMV mutation, as was described above, is performed at Block 2510. At Block 2520, the TMIB system/level subsystem/level vector data is compared with the TMV. If a match is found at Block 2530, then a potentially vulnerable system/level or subsystem/level identified in the TMV has been determined to be on board. Operations proceed to FIG. 26 at Block 2550, to determine the actual vulnerability. On the other hand, if at Block 2530 no match was found, then at Block 2540, the input TMV is ignored. Operations of Blocks 2520, 2530, 2540 and 2550 may be performed for each on board system/level and subsystem/level in the TMIB, whether or not active. Operations then proceed to a vulnerability state manager at Block 2560, which will be described in connection with FIG. 27.

Referring now to FIG. 26, at Block 2610, in response to identification of a potentially vulnerable system/level or subsystem/level in a TMV at Block 2550, the TMIB vulnerability/countermeasures vector data for the TMV system or subsystem level is accessed. At Block 2620, the TMIB vulnerability/countermeasures vector data is compared with each TMV vulnerability vector. If a match is found at Block 2630, and if the TMV data supercedes the TMIB data at Block 2640, then at Block 2650, the TMIB vulnerability/countermeasures data is reset with data from the TMV. On the other hand, if a match is not found at Block 2630, then the new TMIB vulnerability countermeasures vector data from the TMV is added at Block 2670. Alternatively, if a match is found but the TMV data does not supercede the TMIB data, then at Block 2660, the TMV vulnerability/ countermeasures vector data can be ignored. The operations at Blocks 2620-2670 may be performed for each vulnerability vector in the TMV for the affected system/level or subsystem/level.

Figure 27:
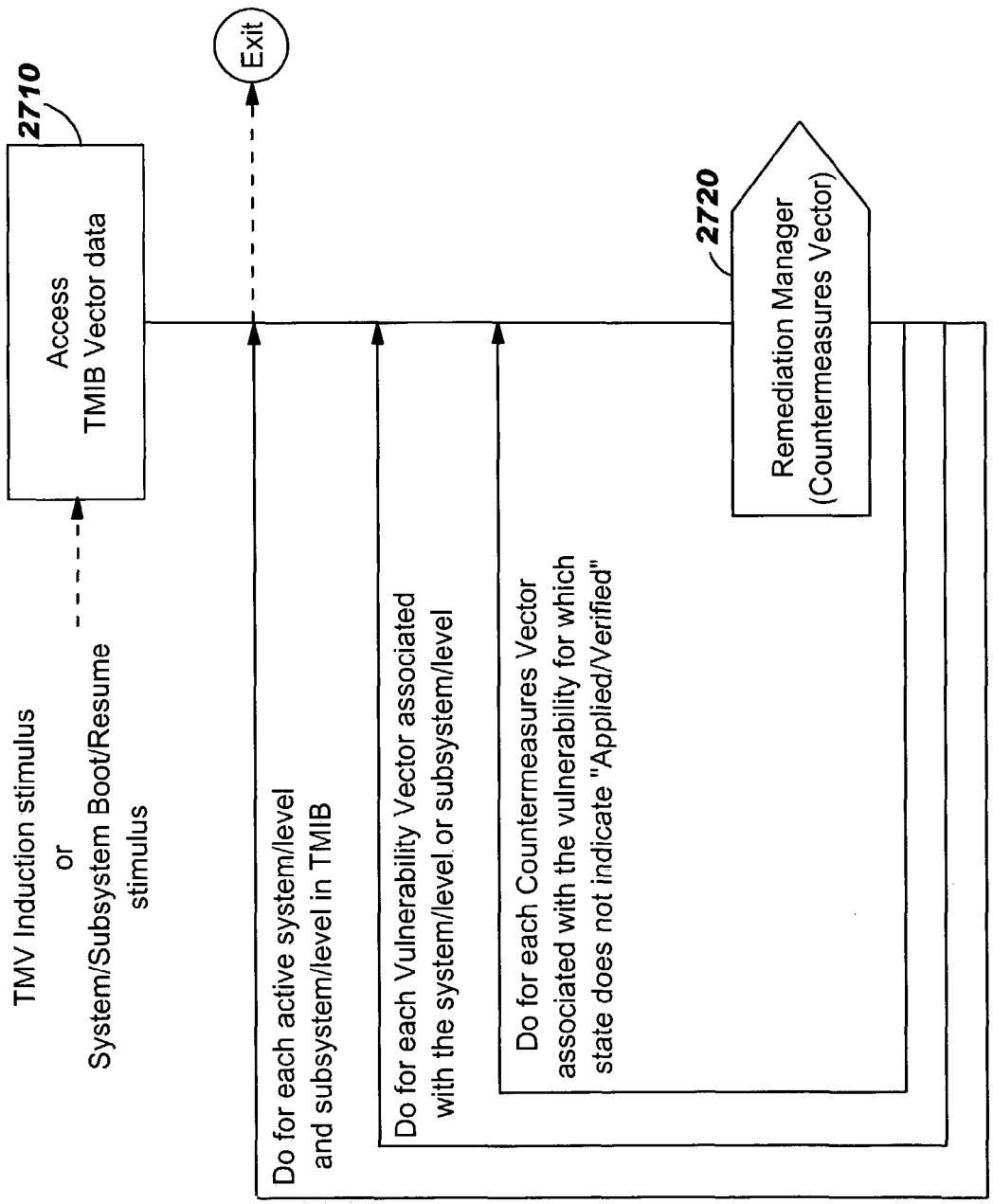
FIG. 27 is a flowchart of operations that may be performed for vulnerability state management according to embodiments of the present invention.

FIG. 27 is a flowchart of operations that may be performed for vulnerability state management according to embodiments of the present invention. These operations may be performed by the vulnerability state manager 1860 of FIG. 18 and/or the vulnerability state management Block 1930 of FIG. 19. Referring now to FIG. 27, at Block 2710, in response to a TMV induction stimulus or a system/subsystem boot or resume stimulus, TMIB vector data is accessed. At Block 2720, the remediation manager is called, as will be described in FIG. 28. Operations of Block 2710 and Block 2720 may be performed for each active system/level and subsystem/level in the TMIB, for each vulnerability vector associated therewith, and for each countermeasures vector associated with the vulnerability for which a state does not indicate "applied/verified".

Figure 28:
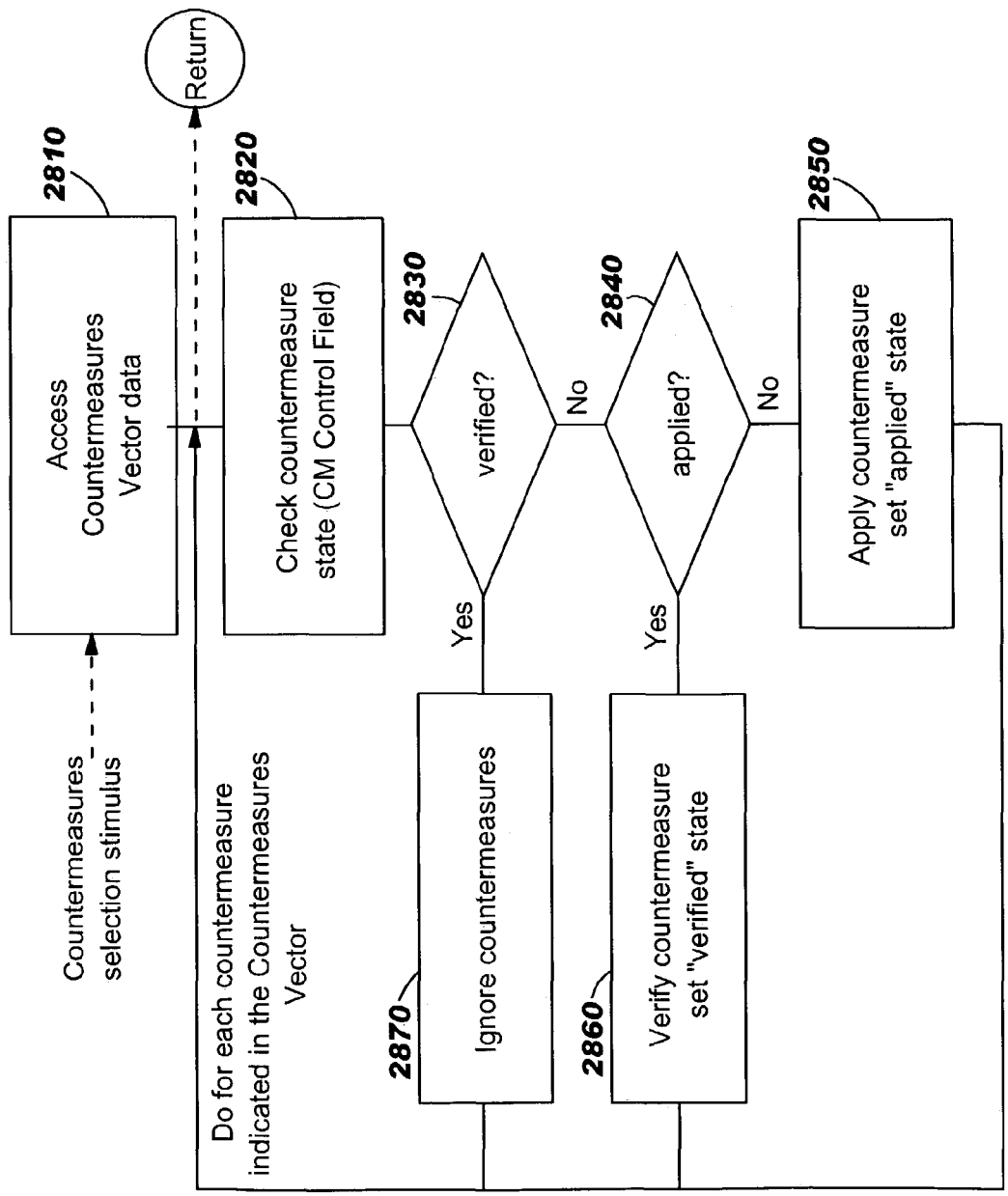
FIG. 28 is a flowchart of operations that may be performed for remediation management according to embodiments of the present invention.

Referring now to FIG. 28, operations for remediation management according to some embodiments of the present invention will now be described. These operations may be performed by the remediation manager 1870 of FIG. 18 and/or the remediation management Block 1940 of FIG. 19. Referring to FIG. 28, in response to countermeasures selection stimulus, countermeasures vector data is accessed at Block 2810. The countermeasure state is checked by checking the CM control field at Block 2820. If verified at Block 2830, then the countermeasure is ignored at Block 2870. If the countermeasure is not verified, but is applied at Block 2840, then the countermeasure is verified and set to the "verified" state. If the countermeasure is not applied at Block 2840, then the countermeasure is applied and is set to the "applied" state at Block 2850. The operations of Blocks 2820-2870 may be performed for each countermeasure indicated in the countermeasures vector.

As described above, some embodiments of the invention can permit a computer system to become autonomic (self-healing) to a large degree. This can reduce the human labor associated with the application of security patches, and the associated labor costs. Because of the autonomic characteristics of some embodiments of the present invention, security patches may be applied more rapidly, which can reduce exposure time duration and the corresponding aggregate costs associated with recovering from system penetration attempts.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of administering a countermeasure for a computer security threat to a computer system, comprising:
    establishing a baseline identification of an operating system type and an operating system release level for the computer system that is compatible with a Threat Management Vector (TMV);
    receiving a TMV including therein a first field that provides identification of at least one operating system type that is affected by a computer security threat, a second field that provides identification of an operating system release level for the operating system type and a third field that provides identification of a set of possible countermeasures for an operating system type and an operating system release level; and
    processing countermeasures that are identified in the TMV if the TMV identifies the operating system type and operating system release level for the computer system as being affected by the computer security threat;
    wherein the processing comprises:
    determining whether the TMV identifies the operating system type and operating system release level for the computer system as being affected by the computer security threat;
    adding at least one instance identifier to the TMV to account for multiple instances of the operating system running on the computer system, if the TMV identifies the operating system type and operating system release level for the computer system as being affected by the computer security threat; and
    processing countermeasures that are identified in the TMV for the instance of the operating system type and operating system release level when the instance of the operating system type and operating system release level is instantiated in the computer system.

2. A method according to claim 1 wherein the processing comprises installing and running the countermeasure.

3. A method of administering a countermeasure for a computer security threat to a computer system, comprising:
    establishing a baseline identification of an operating system type and an operating system release level for the computer system that is compatible with a Threat Management Vector (TMV);
    receiving a TMV including therein a first field that provides identification of at least one operating system type that is affected by a computer security threat, a second field that provides identification of an operating system release level for the operating system type and a third field that provides identification of a set of possible countermeasures for an operating system type and an operating system release level; and
    processing countermeasures that are identified in the TMV if the TMV identifies the operating system type and operating system release level for the computer system as being affected by the computer security threat;
    wherein the receiving comprises receiving a TMV including therein the first field that provides identification of at least one operating system type that is affected by a computer security threat, the second field that provides identification of an operating system release level for the operating system type, a fourth field that provides identification of at least one application program type that is affected by the computer security threat and a fifth field that provides identification of a release level for the application program type, the third field providing identification of a set of possible countermeasures for the application program type and the application program release level; and
    wherein the processing comprises processing countermeasures that are identified in the TMV if the TMV identifies the application program type and application program release level for the computer system as being affected by the computer security threat.

4. A method according to claim 3 wherein the processing further comprises:
    determining whether the TMV identifies the application program type and application programming release level for the computer system as being affected by the computer security threat;

adding at least one instance identifier to the TMV to account for multiple instances of the application program running on the computer system if the TMV identifies the application program type and application program release level for the computer system as being affected by the computer security threat; and processing countermeasures that are identified in the TMV for the instance of the application program type and application program release level when the instance of the application program type and application program release level is instantiated in the computer system.

5. A computer program product is configured to administer a countermeasure for a computer security threat to a computer system, the computer program product comprising a computer usable storage medium having computer-readable program code embodied in the medium, the computer-readable program code comprising:

computer-readable program code that is configured to establish a baseline identification of an operating system type and an operating system release level for the computer system that is compatible with a Threat Management Vector (TMV);

computer-readable program code that is configured to receive a TMV including therein a first field that provides identification of at least one operating system type that is affected by a computer security threat, a second field that provides identification of an operating system release level for the operating system type and a third field that provides identification of a set of possible countermeasures for an operating system type and an operating system release level; and computer-readable program code that is configured to process countermeasures that are identified in the TMV if the TMV identifies the operating system type and operating system release level for the computer system as being affected by the computer security threat;

wherein the computer-readable program code that is configured to process comprises:

computer-readable program code that is configured to determine whether the TMV identifies the operating system type and operating system release level for the computer system as being affected by the computer security threat;

computer-readable program code that is configured to add at least one instance identifier to the TMV to account for multiple instances of the operating system running on the computer system if the TMV identifies the operating system type and operating system release level for the computer system as being affected by the computer security threat; and computer-readable program code that is configured to process countermeasures that are identified in the TMV for the instance of the operating system type and operating system release level when the instance of the operating system type and operating system release level is instantiated in the computer system.

* * * * *